US011471939B2

(12) United States Patent
Xia et al.

(10) Patent No.: US 11,471,939 B2
(45) Date of Patent: Oct. 18, 2022

(54) METHODS OF NANOSTRUCTURE FORMATION AND SHAPE SELECTION

(71) Applicant: University of Washington, Seattle, WA (US)

(72) Inventors: Younan Xia, Seattle, WA (US); Yugang Sun, Champaign, IL (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 16/459,407

(22) Filed: Jul. 1, 2019

(65) Prior Publication Data
US 2021/0032099 A1 Feb. 4, 2021

Related U.S. Application Data

(60) Continuation of application No. 14/919,515, filed on Oct. 21, 2015, now Pat. No. 10,384,936, which is a
(Continued)

(51) Int. Cl.
*B22F 9/24* (2006.01)
*B22F 1/00* (2022.01)
(Continued)

(52) U.S. Cl.
CPC ............ *B22F 1/0007* (2013.01); *B22F 1/054* (2022.01); *B22F 9/24* (2013.01); *B82Y 30/00* (2013.01);
(Continued)

(58) Field of Classification Search
None
See application file for complete search history.

(56) References Cited

U.S. PATENT DOCUMENTS 5,476,535 A  12/1995  Khasin
5,759,230 A  6/1998  Chow
(Continued)

FOREIGN PATENT DOCUMENTS

JP  6122905  5/1994
WO  02087749  11/2002
(Continued)

OTHER PUBLICATIONS

Wei, G-T. et al., "Shape Separation of Nanometer Gold Particles by Size-Exclusion Chromatography", Analytical Chemistry, vol. 71, No. 11 Jun. 1, 1999, pp. 2085-2091.*
(Continued)

*Primary Examiner* — George Wyszomierski
(74) *Attorney, Agent, or Firm* — Christensen O'Connor Johnson Kindness PLLC

(57) ABSTRACT

Methods for forming nanostructures of various shapes are disclosed. Nanocubes, nanowires, nanopyramids and multiply twinned particles of silver may by formed by combining a solution of silver nitrate in ethylene glycol with a solution of poly(vinyl pyrrolidone) in ethylene glycol. Hollow nanostructures may be formed by reacting a solution of solid nanostructures comprising one of a first metal and a first metal alloy with a metal salt that can be reduced by the first metal or first metal alloy. Nanostructures comprising a core with at least one nanoshell may be formed by plating a nanostructure and reacting the plating with a metal salt.

7 Claims, 26 Drawing Sheets

Related U.S. Application Data continuation of application No. 12/509,873, filed on Jul. 27, 2009, now Pat. No. 9,394,168, which is a division of application No. 10/732,910, filed on Dec. 9, 2003, now Pat. No. 7,585,349.

(60) Provisional application No. 60/432,098, filed on Dec. 9, 2002.

(51) Int. Cl.
    *B22F 1/054*     (2022.01)
    *B82Y 30/00*     (2011.01)
    *B82Y 40/00*     (2011.01)

(52) U.S. Cl.
CPC ........... *B22F 1/0549* (2022.01); *B22F 1/0553* (2022.01); *B22F 2009/245* (2013.01); *B22F 2301/255* (2013.01); *B22F 2304/05* (2013.01); *B22F 2998/00* (2013.01); *B82Y 40/00* (2013.01); *Y10S 977/896* (2013.01)

(56) References Cited

U.S. PATENT DOCUMENTS

| | | | |
|---|---|---|---|
| 5,772,754 | A | 6/1998 | Tanaka |
| 6,012,658 | A | 1/2000 | Khasin |
| 6,413,487 | B1 | 7/2002 | Resasco |
| 6,530,944 | B2 | 3/2003 | West |
| 6,875,253 | B2 | 4/2005 | Daimon |
| 7,348,365 | B2 | 3/2008 | Lee |
| 7,566,360 | B2 | 7/2009 | Garbar |
| 7,585,349 | B2 | 9/2009 | Xia |
| 7,601,406 | B2 | 10/2009 | Garbar |
| 7,736,693 | B2 | 6/2010 | Garbar |
| 8,114,187 | B2 | 2/2012 | Xia |
| 9,109,270 | B2 | 8/2015 | Xia |
| 9,388,480 | B2 | 7/2016 | Xia |
| 10,384,936 | B2 * | 8/2019 | Xia ......................... B22F 1/054 |
| 2001/0009119 | A1 | 7/2001 | Murray |
| 2002/0070121 | A1 | 6/2002 | Nayfeh |
| 2002/0115747 | A1 | 8/2002 | Feldheim |
| 2003/0107024 | A1 | 6/2003 | Tai |
| 2003/0136223 | A1 | 7/2003 | Jin |
| 2003/0203282 | A1 | 10/2003 | Grugeon |
| 2004/0020327 | A1 | 2/2004 | Hattori |
| 2005/0056118 | A1 | 3/2005 | Xia |
| 2005/0085379 | A1 | 4/2005 | Ishihara |
| 2005/0214480 | A1 | 9/2005 | Garbar |
| 2006/0177660 | A1 | 8/2006 | Kumar |
| 2007/0289409 | A1 | 12/2007 | Xia |
| 2008/0003130 | A1 | 1/2008 | Xia |
| 2009/0282948 | A1 | 11/2009 | Xia |
| 2012/0125156 | A1 | 5/2012 | Xia |
| 2015/0336174 | A1 | 11/2015 | Xia |

FOREIGN PATENT DOCUMENTS

| | | |
|---|---|---|
| WO | 2003106573 | 12/2003 |
| WO | 2004005413 | 1/2004 |

OTHER PUBLICATIONS

Link, S. et al., "Laser-Induced Shape Change of Colloidal Gold Nanorods Using Femtosecond and Nanosecond Laser Pulses", J. of Physical Chemistry B, vol. 104, pp. 6152-6163, published on Web Jun. 10, 2000.*
Jana, N.R. et al., "Wet chemical synthesis of silver nanorods and nanowires of controllable aspect ratio", Chemical Communications, 2001, pp. 617-618, published on Web Mar. 13, 2001.*
Jana, N.R. et al., "Wet Chemical Synthesis of High Aspect Ratio Cylindrical Gold Nanorods", J. of Physical Chemistry B, vol. 105, pp. 4065-4067, published on Web Apr. 21, 2001.*
Wiley, et al., "Shape Control of Silver Nanoparticles," Chemistry A European Journal, vol. 11, No. 2, pp. 454-463, (2005).
Lofton, et al., "Mechanisms Controlling Crystal Habits of Gold and Silver Colloids," Advance Functional Materials, vol. 15, No. 7, pp. 1197-1208, (2005).
Nicewarner-Pena, et al., "Submicrometer Metallic Barcodes," Science, vol. 294, No. 5540, pp. 137-141, (Oct. 5, 2001).
Office Action in Ex Parte Reexamination dated Feb. 12, 2015 in U.S. Control No. 90/013,318.
Bonet, et al., "Study of Interaction of Ethylene Glycol/PVP Phase on Nobel Metal Powders Prepared by Polyol Process," Bull Mater Sci., vol. 23, pp. 165-168 (Jun. 2000).
Silvert et al., "Preparation of Colloidal Silver Dispersions by Polyol Process, Part 1—Synthesis and Characterization," J Mater Chem, vol. 6, pp. 573-577 (Jan. 10, 1996).
Silvert et al., "Preparation of Colloidal Silver Dispersions by Polyol Process, Part 2", Mater Chem, vol. 7, pp. 293-299 (1997).
Sun et al., "Gold and Silver Nanoparticles: A Class of Chromophores with Colors Tunable in the Range from 400 to 750 nm," Analyst, vol. 128, pp. 668-691 (Apr. 4, 2003).
Zhang et al., "PVP Protective Mechanism of Ultrafine Silver Powder Synthesized by Chemical Reduction Processes," J Solid State Chem vol. 121, No. 1, pp. 105-110 (Jan. 5, 1996).
Restriction Requirement dated Mar. 23, 2007 in U.S. Appl. No. 10/732,910, 8 pages.
Restriction Requirement dated Feb. 9, 2009 in U.S. Appl. No. 11/701,974, 12 pages.
Supplemental Response filed Mar. 12, 2015 in U.S. Appl. No. 13/367,217, 6 pages.
Non-Final Office Action dated Mar. 19, 2015 in U.S. Appl. No. 13/367,217, 8 pages.
Response to Non-Final Office Action filed Mar. 25, 2015 in U.S. Appl. No. 13/367,217, 8 pages.
Notice of Allowance dated Apr. 7, 2015 in U.S. Appl. No. 13/367,217, 8 pages.
Preliminary Amendment filed Jun. 30, 2015 in U.S. Appl. No. 14/788,519, 6 pgs.
Notice to File Corrected Application Papers dated Jul. 20, 2015 in U.S. Appl. No. 14/788,519, 2 pgs.
Response to Notice to File Corrected Application Papers filed Jul. 27, 2015 in U.S. Appl. No. 14/788,519, 6 pgs.
Non-Final Office Action dated Sep. 20, 2015 in U.S. Appl. No. 14/788,519, 8 pgs.
Reexamination Request filed Aug. 13, 2014 in U.S. Pat. No. 7,585,349, 29 pgs.
Reexamination Order dated Sep. 19, 2014 in U.S. Pat. No. 7,585,349, 9 pgs.
Reexamination Office Action dated Feb. 12, 2015 in U.S. Pat. No. 7,585,349, 12 pgs.
Reexamination Response to Office Action filed Apr. 10, 2015 in U.S. Pat. No. 7,585,349, 27 pgs.
Reexamination Final Office Action dated Jul. 24, 2015 in U.S. Pat. No. 7,585,349, 19 pgs.
Reexamination Response to Final Office Action filed Sep. 21, 2015 in U.S. Pat. No. 7,585,349, 18 pgs.
Reexamination Advisory Action dated Sep. 30, 2015 in U.S. Pat. No. 7,585,349, 4 pgs.
Preliminary Amendment dated Oct. 21, 2015, from U.S. Appl. No. 14/919,515.
Notice to File Missing Parts dated Nov. 5, 2015, from U.S. Appl. No. 14/919,515.
Response to Notice to File Missing Parts dated Mar. 7, 2016, from U.S. Appl. No. 14/919,515.
Kugang Sun and Younan Xia, "Shape-Controlled Synthesis of Gold and Silver Nanoparticles," Science, vol. 298, Dec. 13, 2002, pp. 2176-2179.
Yugang Sun and Younan Xia, "Alloying and Dealloying Processes Involved in the Preparation of Metal Nanoshells Through a Galvanic Replacement Reaction," Nano Letters, vol. 0, No. 0, Sep. 11, 2003, Department of Chemistry, University of Washington, pp. A-D.
Yugang Sun, Brian Mayers and Younan Xia, "Template-Engaged Replacement Reaction: A One-Step Approach to the Large-Scale

(56) References Cited

OTHER PUBLICATIONS

Synthesis of Metal Nanostructures with Hollow Interiors," Nano Letters 2002, vol. 2, No. 5, Feb. 21, 2002, Department of Chemistry, University of Washington, pp. 481-485.
Yugang Sun and Younan Xia, "Increased Sensitivity of Surface Plasmon Resonance of Gold Nanoshells Compared to that of Gold Solid Colloids in Response to Environmental Changes," Analytical Chemistry, vol. 74, No. 20, Oct. 15, 2002, pp. 5297-5305.
Yugang Sun, Brian Mayers and Younan Xia, "Metal Nanostructures with Hollow Interiors," Advanced Materials, 15, No. 7-8, Apr. 17, 2003, pp. 641-646.
Catherine J. Murphy, "Nanocubes and Nanoboxes," Science, vol. 298, Dec. 13, 2002, pp. 2139-2141.
Yugang Sun and Younan Xia, "Multiple-Walled Nanotubes Made of Metals," Communication to Advanced Materials. Jul. 2003.
Yugang Sun and Younan Xia, "Large-Scale Synthesis of Uniform Silver Nanowires Through a Soft, Self-Seeding, Polyol Process," Advanced Materials, 14, No. 11, Jun. 5, 2002, pp. 833-837.
Yugang Sun and Younan Xia, "Insights into the Replacement Reaction Between Silver Nanostructures and Chloroauric Acid in Aqueous Medium," Article to JACS, Oct. 2003, 23 pages.
Jana et al., "Wet Chemical Synthesis of Silver Nanorods and Nanowires of Controllable Aspect Ratio," The Royal Society of Chemistry, pp. 617-618, 2001.
Jeyadevan et al., "Towards Direct Synthesis offct-FePt Nanoparticles by Chemical Route," Journal of Applied Physics, vol. 93, No. 10, pp. 7574-7576 (May 15, 2003).
Spitsyn et al., "Some Characteristics of the Process of Oxidizing Uranium by Tervalent Iron Ions," Atomnaya Energiya, vol. 17, No. 2, (Aug. 1964) pp. 119-123 (original), pp. 827-831 (English-language translation) [Only the EnQIish translation is provided].
Li et al., "Ultrasonic Solvent Induced Morphological Change of Au Colloids," Material Letters, vol. 58, Issue 1-2 196-199 (2004, but available online Jun. 14, 2003).
Office Action dated Feb. 15, 2008 in co-pending U.S. Appl. No. 11/197,745, titled Synthesis of Platinum Nanostructures, filed Jun. 3, 2005.
Response to Office Action filed Aug. 15, 2008 in reply to the Office Action dated Feb. 15, 2008 in U.S. Appl. No. 11/197,745, titled Synthesis of Platinum Nanostructures, filed Jun. 3, 2005.
Office Action dated Dec. 3, 2008 in co-pending U.S. Appl. No. 11/197,745, titled Synthesis of Platinum Nanostructures, filed Jun. 3, 2005.
Response to Office Action filed Apr. 3, 2009 in reply to the Office Action dated Dec. 3, 2008 in U.S. Appl. No. 11/197,745, titled Synthesis of Platinum Nanostructures, filed Jun. 3, 2005.
Preliminary Amendment filed Mar. 19, 2008 in co-pending U.S. Appl. No. 11/701,974, titled Methods for Production of Silver Nanostructures, filed Feb. 1, 2007.
Office Action dated Feb. 9, 2009 in co-pending U.S. Appl. No. 11/701,974, titled Methods for Production of Silver Nanostructures, filed Feb. 1, 2007.
Carotenuto, G. et al., "Preparation and characterization of nano-sized Ag/PVP composites for optical applications", European Physical Journal B, vol. 16, pp. 11-17, Jul. 26, 2000.
Sun, Y. et al., "Crystalline Silver Nanowires by Soft Solution Processing", Nano Letters, vol. 2 No. 2, pp. 165-168, Jan. 3, 2002.
Office Action dated Aug. 2, 2010, from U.S. Appl. No. 12/509,873.
Response to Office Action dated Jan. 31, 2011, from U.S. Appl. No. 12/509,873.
Office Action dated Mar. 29, 2011, from U.S. Appl. No. 12/509,873.
Response to Office Action dated Jun. 29, 2011, from U.S. Appl. No. 12/509,873.
Office Action dated Oct. 10, 2012, from U.S. Appl. No. 12/509,873.
Response to Office Action dated Apr. 10, 2013, from U.S. Appl. No. 12/509,873.
Office Action dated May 14, 2013, from U.S. Appl. No. 12/509,873.
Response to Office Action dated Nov. 8, 2013, from U.S. Appl. No. 12/509,873.
Notice of Non-Compliant Amendment dated Jan. 3, 2014, from U.S. Appl. No. 12/509,873.
Response to Notice of Non-Compliant Amendment dated Jan. 7, 2014, from U.S. Appl. No. 12/509,873.
Office Action dated Mar. 20, 2014, from U.S. Appl. No. 12/509,873.
Response to Office Action dated Jun. 6, 2014, from U.S. Appl. No. 12/509,873.
Office Action dated Aug. 7, 2014, from U.S. Appl. No. 12/509,873.
Response to Office Action dated Feb. 3, 2015, from U.S. Appl. No. 12/509,873.
Office Action dated Apr. 21, 2015, from U.S. Appl. No. 12/509,873.
Response to Office Action dated Oct. 21, 2015, from U.S. Appl. No. 12/509,873.
Office Action dated Nov. 5, 2015, from U.S. Appl. No. 12/509,873.
Office Action dated Jan. 14, 2013, from U.S. Appl. No. 13/367,217.
Response to Office Action dated Apr. 11, 2013, from U.S. Appl. No. 13/367,217.
Office Action dated May 2, 2013, from U.S. Appl. No. 13/367,217.
Response to Office Action dated Aug. 30, 2013, from U.S. Appl. No. 13/367,217.
Office Action dated Oct. 22, 2013, from U.S. Appl. No. 13/367,217.
Response to Office Action dated Mar. 24, 2014, from U.S. Appl. No. 13/367,217.
Office Action dated Jun. 12, 2014, from U.S. Appl. No. 13/367,217.
Response to Office Action dated Dec. 12, 2014, from U.S. Appl. No. 13/367,217.
Notice of Allowance dated Jan. 26, 2015, from U.S. Appl. No. 13/367,217.
Notice of Allowance dated Feb. 20, 2015, from U.S. Appl. No. 13/367,217.
Notice to File Corrected Application Papers dated Mar. 5, 2015, from U.S. Appl. No. 13/367,217.
Response to Notice to File Corrected Application Papers dated Mar. 12, 2015, from U.S. Appl. No. 13/367,217.
Office Action dated Mar. 19, 2015, from U.S. Appl. No. 13/367,217.
Response to Office Action dated Mar. 25, 2015, from U.S. Appl. No. 13/367,217.
Notice of Allowance dated Apr. 7, 2015, from U.S. Appl. No. 13/367,217.
Preliminary Amendment dated Jun. 30, 2015, from U.S. Appl. No. 14/788,519.
Notice to File Corrected Application Papers dated Jul. 20, 2015, from U.S. Appl. No. 14/788,519.
Response to Notice to File Corrected Application Papers dated Jul. 27, 2015, from U.S. Appl. No. 14/788,519.
Notice of Incomplete Reply dated Aug. 4, 2015, from U.S. Appl. No. 14/788,519.
Notice of Incomplete Reply dated Aug. 11, 2015, from U.S. Appl. No. 14/788,519.
Office Action dated Sep. 29, 2015, from U.S. Appl. No. 14/788,519.
Response to Office Action dated Dec. 28, 2015, from U.S. Appl. No. 14/788,519.
Notice of Reexamination Request Filing Date (Third Party Requester) dated Aug. 19, 2014, from U.S. Appl. No. 90/013,318.
Notice of Assignment of Reexamination Request dated Aug. 19, 2014, from U.S. Appl. No. 90/013,318.
Request for Ex Parte Reexamination mailed Aug. 13, 2014, from U.S. Appl. No. 90/013,318.
Order Granting the Request for Ex Parte Reexamination mailed Sep. 19, 2014, from U.S. Appl. No. 90/013,318.
Office Action in Ex Parte Reexamination dated Feb. 12, 2015, from U.S. Appl. No. 90/013,318.
Response to Office Action dated Apr. 10, 2015, from U.S. Appl. No. 90/013,318.
Ex Parte Reexamination Interview Summary dated May 19, 2015, from U.S. Appl. No. 90/013,318.
Response to the Ex Parte Reexamination Interview Summary dated Jun. 12, 2015, from U.S. Appl. No. 90/013,318.
Final Office Action in Ex Parte Reexamination dated Jul. 24, 2015, from U.S. Appl. No. 90/013,318.
Response to Office Action dated Sep. 21, 2015, from U.S. Appl. No. 90/013,318.
Advisory Action dated Sep. 30, 2015, from U.S. Appl. No. 90/013,318.

(56) References Cited

OTHER PUBLICATIONS

Sun, Y. et at., "Uniform Silver Nanowires Synthesis by Reducing AgN03 with Ethylene Glycol in th Presence of Seeds and Poly(Vinyl Pyrrolidone)", Chem. Mater, 2002, No. 14, pp. 4736-4745, Oct. 8, 2002.
Krenn, J .R., "Nanoparticle waveguides: Watching energy transfer," Nature Materials, vol. 2, pp. 210-211, (Apr. 2003).
Sun, et al., "Transformation of Silver Nanospheres into Nanobelts and Triangular Nanoplates through a Thermal Process," Nano Letters, vol. 3, No. 5, pp. 675-679, (Apr. 18, 2003).
Sun, et al., "Gold and silver nanoparticles: A class of chromophores with colors tunable in the range from 400 to 750 nm," Analyst, vol. 128, pp. 686-691, (Apr. 4, 2003).
Office Action dated Aug. 2, 2010 in U.S. Appl. No. 12/509,873.
Response to Office Action filed Jan. 31, 2011 in U.S. Appl. No. 12/509,873.
Office Action dated Mar. 29, 2011 in U.S. Appl. No. 12/509,873.
Office Action dated Oct. 10, 2012 in U.S. Appl. No. 12/509,873.
Response to Office Action filed Apr. 10, 2013 in U.S. Appl. No. 12/509,873.
Office Action dated May 14, 2013 in U.S. Appl. No. 12/509,873.
Response to Office Action filed Nov. 8, 2013 in U.S. Appl. No. 12/509,873.
Notice of Non-Compliant or Non-Responsive Amendment dated Jan. 3, 2014 in U.S. Appl. No. 12/509,873.
Response to Notice of Non-Compliant or Non-Responsive Amendment filed Jan. 7, 2014 in U.S. Appl. No. 12/509,873.
Final Office Action dated Mar. 20, 2014 in U.S. Appl. No. 12/509,873.
Response to Office Action filed Jun. 6, 2014 in U.S. Appl. No. 12/509,873.
Office Action dated Aug. 7, 2014 in U.S. Appl. No. 12/509,873.
Response to Office Action filed Aug. 30, 2013 in U.S. Appl. No. 13/367,217.
Response to Office Action filed Mar. 24, 2014 in U.S. Appl. No. 13/367,217.
Office Action dated Jun. 12, 2014 in U.S. Appl. No. 13/367,217.
Response to Office Action filed Jun. 29, 2011 in U.S. Appl. No. 12/509,873.
Response to Advisory Action dated Nov. 24, 2015, from U.S. Appl. No. 90/013,318.
Advisory Action dated Jan. 22, 2016, from U.S. Appl. No. 90/013,318.
Appeal Brief Filed mailed Jan. 26, 2016, from U.S. Appl. No. 90/013,318.
Response to Office Action dated Mar. 23, 2016, from U.S. Appl. No. 12/509,873.
Office Action dated Feb. 18, 2016, from U.S. Appl. No. 14/788,519.
Response to Office Action dated Mar. 7, 2016, from U.S. Appl. No. 14/788,519.
Notice of Allowance dated Mar. 16, 2016, from U.S. Appl. No. 14/788,519.
Examiner's Answer dated Feb. 25, 2016, from U.S. Appl. No. 90/013,318.
Reply Brief Filed mailed Apr. 25, 2016, from U.S. Appl. No. 90/013,318.
Notice of Allowance dated May 26, 2016, from U.S. Appl. No. 12/509,873.
Wang, et al., A Simple Hydrothermal Route Io Large-Scale Synthesis of Uniform Silver Nanowires, Chemisby: A European Journal, 11, 2005 (first published Dec. 15, 2004), pp. 160-163. (Year: 2004).
U.S. Appl. No. 15/171,578, et al., Xia, et al., Office Action dated Jan. 24, 2019 for U.S. Appl. No. 15/171,578.
U.S. Appl. No. 15/171,578, et al., Xia, et al., Restriction Requirement dated Oct. 1, 2018 for U.S. Appl. No. 15/171,578.
U.S. Appl. No. 16/031,681, et al., Xia, Office Action dated Sep. 26, 2018 for U.S. Appl. No. 16/031,681.
Xia, et al., Office Action dated Mar. 29, 2019 for U.S. Appl. No. 16/031,681.
Wei, G. et al., "Shape Separation of Nanometer Gold Particles by Size-Exclusion Chromatography", Analytical Chemistry, vol. 71, No. 11, pp. 2085-2091, Jun. 1, 1999.

Sun, Y. et al., "Template-Engaged Replacement Reaction: A One Step Approach to the Large-Scale Synthesis of Metal Nanostructures with Hollow Interiors", Nano Letters, vol. 2, No. 5, pp. 481-485, Mar. 30, 2002.
Sun, Y. et al., "Large-Scale Synthesis of Uniform Silver Nanowires Through a Soft, Self-Seeding, Polyol Process", Advanced Materials, vol. 14, No. 11, pp. 833-837, Jun. 5, 2002.
Porter, L. et al., "Controlled Electroless Deposition of Noble Metal Nanoparicle Films on Germanim Surfaces", Nano Letters, vol. 2, No. 10, pp. 1067-1071, Sep. 7, 2002.
Ayyappan, S. et al., "Nanoparticles of Ag, Au, Pd, and Cu produced by alcohol reduciton of the salts", Journal of Nanoparticle Research, vol. 12, No. 2, Feb. 1997, pp. 398-401.
Jana, N.R. et al., "Wet chemical synthesis of silver nanorods and nanowires of controllable aspect ratio", Chemistry Communications, 2001, pp. 617-618, published Mar. 13, 2001.
Hegde, M.S. et al., "Synthesis and chemical reactivily of polyol prepared monodisperse nickel powders", Solid State Ionics, vol. 93, pp. 33-50, 1997.
Citation of WIPO document 02/087749-A 1, published Nov. 7, 2002.
Carotenuto, et al., Preparation and Characterization of Nano-Sized Ag/PVP Composites for Optical Applications, The European Physical Journal B, pp. 11-17 (2000).
Duchamp-Sanguesa, et al., "Synthesis and Characterization of Fine and Monodisperse Silver Particles of Uniform Shape," Journal of Solid State Chemistry, pp. 272-280, (1992).
Li et al., "Ultrasonic Solvent Induced Morphological Change of Au Colloids," Material Letters, vol. 58, Issue 1-2, pp. 196-199 (2004)—Available online Jun. 14, 2003.
Murphy, "Nanocubes and Nanoboxes," Science, vol. 298, pp. 2139-2141, (Dec. 13, 2002).
Spitsyn et al., "Some Characteristics of the Process of Oxidizing Uranium by Tervalent Iron Ions," Atomnaya Energiya, vol. 17, No. 2, pp. 119-123 (original), pp. 827-831, (English translation only) (Aug. 1964).
Sun et al., "Crystalline Silver Nanowires by Soft Solution Processing," Nano Letters, vol. 2, No. 2, pp. 165-168, (2002).
Sun et al., Uniform Silver Nanowires Synthesis by Reducing AgN03 with Ethylene Glycol in the Presence of Seeds and Poly(Vinyl Pyrrolidone), Chem. Mater., vol. 14, pp. 4736-4745, (2002).
Sun et al., "Alloying and Dealloying Processes Involved in the Preparation of Metal Nanoshells Through a Galvanic Replacement Reaction," Nano Letters, vol. 0, pp. A-D, (Sep. 11, 2003).
Sun et al., "Increased Sensitivity of Surface Plasmon Resonance of Gold Nanoshells Compared to That of Gold Solid Colloids in Response to Environmental Changes," Analytical Chemistry, vol. 74, No. 20, pp. 5297-5305 (Oct. 15, 2002).
Sun et al., "Metal Nanostructures with Hollow Interiors," Advanced Materials, vol. 15, No. 7-8, pp. 641-646 (Apr. 17, 2003).
Sun et al., "Insights into the Replacement Reaction Between Silver Nanostructures and Chloroauric Acid in Aqueous Medium," Article to J. Am. Chem. Soc., 23 pages (Oct. 2003).
Preliminary Amendment filed May 18, 2005 in U.S. Appl. No. 10/732,910.
Office Action dated Jun. 22, 2007 in U.S. Appl. No. 10/732,910.
Response to Office Action filed Nov. 21, 2007 in U.S. Appl. No. 10/732,910.
Office Action dated Feb. 5, 2008 in U.S. Appl. No. 10/732,910.
Response to Office Action filed Aug. 5, 2008 in U.S. Appl. No. 10/732,910.
Examiner Interview Summary dated Aug. 11, 2008 in U.S. Appl. No. 10/732,910.
Final Office Action dated Oct. 21, 2008 in U.S. Appl. No. 10/732,910.
Response to Final Office Action filed Feb. 23, 2009 in U.S. Appl. No. 10/732,910.
Office Action dated Feb. 15, 2008 in U.S. Appl. No. 11/197,745.
Response to Office Action filed Aug. 15, 2008 in U.S. Appl. No. 11/197,745.
Office Action dated Dec. 3, 2008 in U.S. Appl. No. 11/197,745.
Response to Office Action filed Apr. 3, 2009 in U.S. Appl. No. 11/197,745.

(56) References Cited

OTHER PUBLICATIONS

Preliminary Amendment filed Mar. 19, 2008 in U.S. Appl. No. 11/701,974.
Office Action dated Sep. 29, 2009 in U.S. Appl. No. 11/701,974.
Chen et al., "Single-Crystal Nanowires of Platinum Can Be Synthesized by Controlling the Reaction Rate of a Polyol Process," J. Am. Chem. Soc., vol. 126, Issue 35, pp. 10854-10855, (Aug. 17, 2004).
Chen et al., "Colloidal Platinum Nanoparticles Stabilized by Vinyl Polymers with Amide Side Chains: Dispersion Stability and Catalytic Activity in Aqueous Electrolyte Solutions," J. Colloid & Interface Sci., vol. 225, pp. 349-358, (2000).
Fievet, et al. "Preparing Monodisperse Metal Powders in Micrometer and Submicrometer Sizes by the PolyolProcess" MRS Bulletin, pp. 29-34, (Dec. 1989).
Sun et al., "Mechanistic Study on the Replacement Reaction Between Silver Nanostructure and chloroauric Acid in Aqueous Medium," J. Am. Chem. Soc., vol. 126, pp. 3892-3901, 2004.
Wiley et al., "Polyol Synthesis of Silver Nanoparticles: Use of Chloride and Oxygen to Promote the Formation of Single-Crystal, Truncated Cubes and Tetrahedrons," Nano Letters, vol. 4, Issue 9, pp. 1733-1739, (Aug. 7, 2004).
Xiong, Y. et al., "Size-Dependence of Surface Plasmon Resonance and Oxidation for Pd Nanocubes Synthesized via a Seed Etching Process," Nano Letters, vol. 5, No. 7, pp. 1237-1242, (Published on Web Jun. 3, 2005).
Notice of Allowance dated Apr. 27, 2009 in U.S. Appl. No. 10/732,910.
Supplemental Notice of Allowability dated Jun. 11, 2009 in U.S. Appl. No. 10/732,910.
Final Office Action dated Jul. 30, 2009 in U.S. Appl. No. 11/197,745.
Response to Final Office Action dated Feb. 1, 2010 in U.S. Appl. No. 11/197,745.
Office Action dated Apr. 13, 2010 in U.S. Appl. No. 11/197,745.
Response to Office Action filed Aug. 13, 2010 in U.S. Appl. No. 11/197,745.
Office Action dated Oct. 28, 2010 in U.S. Appl. No. 11/197,745.
Response to Office Action filed Mar. 2, 2011 in U.S. Appl. No. 11/197,745.
Final Office Action dated May 6, 2011 in U.S. Appl. No. 11/197,745.
Response to Final Office Action filed Aug. 2, 2011 in U.S. Appl. No. 11/197,745.
Notice of Allowance dated Oct. 13, 2011 in U.S. Appl. No. 11/197,745.
Response to Office Action filed Mar. 29, 2010 in U.S. Appl. No. 11/701,974.
Notice of Allowance dated May 27, 2010 in U.S. Appl. No. 11/701,974.
Notice of Allowance dated Sep. 9, 2010 in U.S. Appl. No. 11/701,974.
Office Action dated Dec. 21, 2010 in U.S. Appl. No. 11/701,974.
Response to Office Action filed Jun. 20, 2011 in U.S. Appl. No. 11/701,974.
Final Office Action dated Sep. 6, 2011 in U.S. Appl. No. 11/701,974.
Office Action dated Jan. 14, 2013 in U.S. Appl. No. 13/367,217.
Response to Office Action filed Apr. 11, 2013 in U.S. Appl. No. 13/367,217.
Office Action dated May 2, 2013 in U.S. Appl. No. 13/367,217.
Office Action dated Oct. 22, 2013 in U.S. Appl. No. 13/367,217.
Notice of Reexamination Request Filing Date (Third Party Requester) dated Aug. 19, 2014 in U.S. Control No. 90/013,318.
Notice of Assignment of Reexamination Request dated Aug. 19, 2014 in U.S Control No. 90/013,318.
Request for Ex Parte Reexamination of U.S. Pat. No. 7,585,349 filed Aug. 13, 2014 in U.S. Control No. 90/013,318.
Order Granting the Request for Ex Parte Reexamination dated Sep. 19, 2014 in U.S. Control No. 90/013,318.
Response to Office Action filed Dec. 12, 2014 in U.S. Appl. No. 13/367,217.
Notice of Allowance dated Jan. 26, 2015 in U.S. Appl. No. 13/367,217.

Im, et al., "Large-Scale Synthesis of Silver Nanocubes: The Role of HCI in Promoting Cube Perfection and Mionodispersity," Angew. Chem. Int. Ed., 44(14): 2154-2157 (2005) (manuscript).
Xia, et al., "One-Dimensional Nanostructures: Synthesis, Characterization, and Applications," Advance Materials, vol. 15, No. 5, pp. 353-389, (2003).
Wu, et al., "Superconducting MgB2 Nanowires," Advance Materials, vol. 13, No. 19, pp. 1487-1489, (2001).
Kovtyukhova, et al., "Nanowires as Building Blocks for Self-Assembling Logic and Memory Circuits," Chemistry a European Journal, vol. 8, No. 19, pp. 4354-4363, (2002).
Salzemann, et al., "Collections of Copper Nanocrystals Characterized by Different Sizes and Shapes: Optical Response ofThese Nanoobjects," J. Phys. Chem. B, vol. 108, No. 135, pp. 13242-13248, (Aug. 10, 2004).
Jana, et al., "Anisotropic Chemical Reactivity of Gold Spheroids and Nanorods," Langmuir, vol. 18, No. 3, pp. 922-927, (Jan. 10, 2002).
Ngo, et al., "Assemblies of cigar-shaped ferrite nanocrystals: orientation of the easy magnetization axes," Colloids and Surfaces A: Physicochem. Eng. Aspects, vol. 228, pp. 107-117, (2003).
Puntes, et al., "Colloidal Nanocrystal Shape and Size Control: The Case of Cobalt," Science, vol. 291, No. 5511, pp. 2115-2117 (Mar. 16, 2001).
Wang, et al., "Steps, ledges and kinks on the surfaces of platinum nanoparticles of different shapes," Surface Science, vol. 380, pp. 302-310, (1997).
Roy, et al., "Reflection and Absorption Techniques for Optical Characterization of Chemically Assembled—Nanomaterials," Advance Materials, vol. 16, No. 6, pp. 479-508, (2004).
Kneipp, et al., "Single Molecule Detection Using Surface-Enhanced Raman Scattering (SERS)," Physical Review Letters, vol. 78, No. 9, pp. 1667-1670, (Mar. 3, 1997).
Kottmann, et al., "Plasmon resonances of silver nanowires with a nonregular cross section," Physical Review B, vol. 34, pp. 235402-1-235402-10, (2001).
Haes, et al., "A Nanoscale Optical Biosensor: Sensitivity and Selectivity of an Approach Based on the Localized Surface Plasmon Resonance Spectroscopy of Triangular Silver Nanoparticles," J. Am. Chem. Soc., vol. 124, pp. 35, pp. 10596-10604, (2002).
Moore, et al., "Rapid and ultra-sensitive determination of enzyme activities using surface-enhanced resonance Raman scattering," Nature Biotechnology, vol. 22, No. 9, pp. 1133-1138, (Sep. 2004).
Cao, et al., "Nanoparticles with Raman Spectroscopic Fingerprints for DNA and RNA Detection," Science, vol. 297, No. 5586, pp. 1536-1540, (Aug. 30, 2002).
Jin, et al., "Photoinduced Conversion of Silver Nanospheres to Nanoprisms," Science, vol. 294, No. 5548, pp. 1901-1903, (Nov. 30, 2001).
Sun, et al., "Shape-Controlled Synthesis of Gold and Silver Nanoparticles," Science, vol. 298, No. 5601, pp. 2176-2179, (Dec. 13, 2002).
Jin, et al., "Thermally-Induced Formation of Atomic Au Clusters and Conversion into Nanocubes," J. Am. Chem. Soc., vol. 126, No. 32, pp. 9900-9901, (2004).
Sau, et al., "Room Temperature, High-Yield Synthesis of Multiple Shapes of Gold Nanoparticles in Aqueous Solution," J. Am. Chem. Soc., vol. 126, No. 28, pp. 8648-8649, (2004).
Kim, et al., "Platonic Gold Nanocrystals," Angew. Chem. Int. Ed., vol. 43, No. 28, pp. 3673-3677, (2004).
Sun, et al., "Transformation of Silver Nanospheres into Nanobelts and Triangular Nanoplates through a Thermal Process," Nano Letters, vol. 3, No. 3, pp. 675-679, (2003).
Sun, et al., "Polyol Synthesis of Uniform Silver Nanowires: A Plausible Growth Mechanism and the Supporting Evidence," Nano Letters, vol. 3, No. 7, pp. 955-960, (2003).
Sun, et al., "Uniform Silver Nanowires Synthesis by Reducing AgN03 with Ethylene Glycol in the Presence of Seeds and Poly(Vinyl Pyrrolidone)," Chem Mater, vol. 14, No. 11, pp. 4736-4745, (2002).
Sun, et al., "Metal Nanostructures with Hollow Interiors," Advance Materials, vol. 15, No. 7-8, pp. 641-646, (2003).

(56) References Cited

OTHER PUBLICATIONS

Jana, et al., "Wet Chemical Synthesis of High Aspect Ratio Cylindrical Gold Nanorods," J. Phys. Chem. B, vol. 105, No. 19, pp. 4065-4067, (2001).
Murphy, et al., "Controlling the Aspect Ratio of Inorganic Nanorods and Nanowires," Advance Materials, vol. 14, No. 1, pp. 80-82, (2002).
Kim, et al., "Photochemical Synthesis of Gold Nanorods," J. Am. Chem. Soc., vol. 124, No. 48, pp. 14316-14317, (2002).
Hao, et al., "Synthesis and Optical Properties of "Branched" Gold Nanocrystals," Nano Letters, vol. 4, No. 2, pp. 327-330, (2004).
Chen, et al., "Monopod, Bipod, Tripod, and Tetrapod Gold Nanocrystals," J. Am. Chem. Soc., vol. 125, No. 52, pp. 16186-16187, (2003).
Wiley, et al., "Polyol Synthesis of Silver Nanoparticles: Use of Chloride and Oxygen to Promote the Formation of Single-Crystal, Truncated Cubes and Tetrahedrons," Nano Letters, vol. 4, No. 9, pp. 1733-1739, (2004).
Fievet, et al., "Preparing Monodisperse Metal Powders in Micrometer and Submicrometer Sizes by the Polyol Process," MRS Bulletin, vol. 14, No. 12, pp. 29-34, (Dec. 1989).
Cleveland, et al.,"The energetics and structure of nickel clusters: Size dependence," J. Chem. Phys., vol. 94, No. 11, pp. 7376-7396, (1991).
Ijima, et al., "Structural instability of ultrafine particles of metals," Physical Review Letters, vol. 56, No. 6, pp. 616-621, (Feb. 10, 1986).
Mirkin, et al., "Programming the Assembly of Two- and Three-Dimensional Architectures with DNA and Nanoscale Inorganic Building Blocks," Inorg. Chem., vol. 39, No. 11, pp. 2258-2272, (2000).
Wiley, et al., "Polyol Synthesis of Silver Nanostructures: Control of Product Morphology with FE(II) or Fe(III) Species," Langmuir, vol. 21, No. 18, pp. 8077-8080, (Aug. 30, 2005) (manuscript).
Chen, et al., "Silver Nanodisks: Synthesis, Characterization, and Self-Assembly," The Journal of Physical Chemistry B, vol. 106, No. 42, pp. 10777-10781, (Oct. 24, 2002).
Maillard, et al., "Silver Nanodisks," Advance Materials, vol. 14, No. 15, pp. 1084-1086, (2002).
Chen, et al., "Single-crystal nanowires of platinum can be synthesized by controlling the reaction rate of a polyol process," J. Am. Chem. Soc., vol. 126, No. 35, pp. 10854-10855, (2004).
Ducamp-Sanguesa, et al., "Synthesis and characterization of fine and monodisperse silver particles of uniform shape," Journal of Solid State Chemistry, vol. 100, No. 2, pp. 272-280, (1992).
Campbell, C.T., "Atomic and Molecular Oxygen Adsorption on Ag(111)," Surface Science, vol. 157, pp. 43-60, (1985).
Sexton, et al., "Vibrational Spectra of Molecular and Atomic Oxygen on Ag(110)," Chemical Physical Letters, vol. 76, No. 2, pp. 294-297, (Dec. 1, 1980).
Buatier de Mongeot, et al., "O2 dissociation on Ag(001): the role of kink sites," Chemical Physical Letters, vol. 270, No. 3-4, pp. 345-350, (May 23, 1997).
Wachs, I.E., "Extending surface science studies to industrial reaction conditions: mechanism and kinetics of methanol oxidation over silver surfaces," Surface Science, vol. 544, No. 1, pp. 1-4, (2003).
Serafin, et al., "Surface science and the silver-catalyzed epoxidation of ethylene: an industrial perspective," Journal of Molecular Catalysis A: Chemical, vol. 131, No. 1-3, pp. 157-168, (1998).
Davies, et al., "The development and functions of silver in water purification and disease control," Catalysis Today, vol. 36, No. 1, pp. 107-114, (1997).
Washabaugh, et al., "Purification of Aqueous Ethylene Glycol," Analytical Biochemistry, vol. 134, No. 1, pp. 144-152, (1983).
Wiley, et al., "Right Bipyramids of Silver: A New Shape Derived from Single Twinned Seeds," Nano Letters, vol. 6, No. 1, pp. 765-768, (2006) (manuscript).
Yguerabide, et al., "Light-scattering submicroscopic particles as highly fluorescent analogs and their use as tracer labels in clinical and biological applications," AnaJytical Biochemistry, vol. 262, Article No. AB982759, pp. 137-156, (1998).
Haynes, et al., "Surface-Enhanced Raman Spectroscopy," Analytical Chemistry, vol. 77, No. 338A-346A, (Sep. 1, 2005).
Maier, et al., "Optical pulse propagation in metal nanoparticle chain waveguides," Physical Review B, vol. 67, pp. 205402-1-205402-5, (2003).
Fang, et al., "Sub-Diffraction-Limited Optical Imaging with a Silver Superlens," Science, vol. 308, No. 5721, pp. 534-537, (Apr. 22, 2005).
Andrew, et al., "Energy Transfer Across a Metal Film Mediated by Surface Plasmon Polaritons," Science, vol. 306, No. 5698, pp. 1002-1005, (2004).
Van Duyne, R.P., "Molecular Plasmonics," Science, vol. 306, No. 5698, pp. 985-986, (Nov. 5, 2004).
Haes, et al., "Plasmonic Materials for Surface-Enhanced Sensing and Spectroscopy," MRS Bulletin, vol. 30, No. 5, pp. 368-375, (May 2005).
Hao, et al., "Electromagnetic fields around silver nanoparticles and dimers," The Journal of Chemical Physics, vol. 120, No. 1, pp. 357-366, (Jan. 1, 2004).
Harris, P.J.F., "Sulphur-induced faceting of platinum catalyst particles," Nature, vol. 323, No. 6091, pp. 792-794, (Oct. 30, 1986).
Jana, et al., "Wet chemical synthesis of silver nanorods and nanowires of controllable aspect ratio," Chem. Commun., pp. 617-618, (2001).
Chen, et al., "Polyol Synthesis of Platinum Nanostructures: Control of Morphology through the Manipulation of Reduction Kinetics," Angewandte Chemie Int. Ed., vol. 44, No. 17, pp. 2589-2592, (2005).
Xiong, et al., "Size-Dependence of Surface Plasmon Resonance and Oxidation for Pd Nanocubes Synthesized via a Seed Etching Process," Nano Letters, vol. 5, No. 7, pp. 1237-1242, (2005).
Zettsu, et al., "Synthesis, Stability, and Surface Plasmonic Properties of Rhodium Multipods, and Their Use as Substrates for Surface-Enhanced Raman Scattering," Angewandte Chemie Int. Ed., vol. 45, No. 8, pp. 1288-1292, (2006).
Wiley, et al., "Shape-Controlled Synthesis of Silver and Gold Nanostructures," MRS Bulletin, vol. 30, No. 5, pp. 356-361, (May 2005).
Draine, et al., "Discrete-Dipole Approximation for Scattering Calculations," J. Opt. Soc. Am. A, vol. 11, No. 4, pp. 1491-1499, (Apr. 1994).
Pinchuk, et al., "Substrate effect on the optical response of silver nanoparticles," Nanotechnology, vol. 15, pp. 1890-1896, (2004).
Sherry, et al., "Localized Surface Plasmon Resonance Spectroscopy of Single Silver Nanocubes," Nano Letters, vol. 5, No. 10, pQs. 2034-2038, (2005).
Ajayan, et al., "Quasimelting and phases of small particles," Physical Review Letters, vol. 60, No. 7, pp. 585-587, (Feb. 15, 1988).
Ayyappan et al., "Nanoparticles of Ag, Au, Pd, and Cu Produced by Alcohol Reduction of the Salts," Journal of Nanoparticle Research, vol. 12, No. 2, Feb. 1997, pp. 398-401.
Bonet, et al., "Study of interaction of ethylene glycol/PVP phase on noble metal powders prepared by polyol process," Bull Mater Sci, 23(3):165-168, (Jun. 2000).
Buatier De Mongeot, et al., "02 dissociation on Ag(OOI): the role of kink sites," Chemical 5. Physical Letters, vol. 270, No. 3-4, pp. 345-350, (May 23, 1997).
Carmona, et al., "An experimental model for studying the effect of anisotropy on percolative conduction," J. Physique Letters, vol. 41, No. 22, pp. L531-L533, (1980).
Carotenuto, et al., Preparation and Characterization of Nano-Sized Ag/PVP Composites for Optical Applications, The European Physical Journal B, 11-17 (2000).
Chen, et al., "Polyol Synthesis of Plantinum Nanostuctures; Control of Morphology Through the Manipulation of Reduction Kinetics," Angewandte Chemie Int. Ed., vol. 44, No. 17, pp. 2589-2592 (2005).
Chen, et al., "Synthesis and Characterization of Truncated Triangular Silver Nanoplates," Nano Letters, vol. 2, No. 9, pp. 1003-1007, (2002).

(56) References Cited

OTHER PUBLICATIONS

Doraiswamy, et al., "Electron beam induced small particle transformations: temperature," Surface Science, vol. 348, No. 1-2, pp. L67-L69, (1996).

Draine, et al., "Discrete-Dipole Approxiation for Scattering Calculations," J. Opt. Soc. Am. A., vol. 11, No. 4, pp. 1491-1499 (Apr. 1994).

Fievet, et al., "Preparing Monodisperse Metal Powders in Micrometer and Submicrometer Sizes by the Polyol Process" MRS Bulletin, Dec. 1989, pp. 29-34.

Goia, D.V., "Preparation and formation mechanisms of uniform metallic particles in homogeneous solutions," Journal of Materials Chemistry, vol. 14, pp. 451-458, (2004).

Haes, et al., "Plasmonic Materials for Surface-Enhanced Sensing and Spectroscopy," MRS Bulleting, vol. 30, No. 5., pp. 368-375 (May 2005).

Hao, et al., "Electromagnetic Fields Around Silver Nanoparticles and Dimers," The Journal of Chemical Physics, vol. 120, No. 1, pp. 357-355 (Jan. 1, 2004).

Harris, et al., "Sulphur-Induced Faceting of Plantinum Catalyst Particles," Nature, vol. 323, No. 6091, pp. 792-794 (Oct. 30, 1986).

Haynes, et al., "Surface-Enhanced Raman Spectroscopy," Analytical Chemistry, vol. 77, No. 338A-346A (Sep. 1, 2005).

Hedge, et al., "Synthesis and Chemical Reactivity of Polyol Prepared Monodisperse Nickel Powders," Solid State Ionics, vol. 93, pp. 33-50, (1997).

Hofmeister, et al., "Configuration of twins in glass-embedded silver nanoparticles of various origin," Physica Status Solidi A, vol. 202, No. 12, pp. 2321-2329, (2005).

Jensen, et al., "Electrodynamics of Noble Metal Nanoparticles and Nanoparticle Clusters," Journal of Cluster Science, vol. 10, No. 2, pp. 295-317, (1999).

Jin, et al., "Controlling anisotropic nanoparticle growth through plasmon excitation," Nature, vol. 425, pp. 487-490, (Oct. 2, 2003).

Kim et al., "Photochemical Synthesis of Gold Nanorods," J. Am. Chem. Soc. vol. 124, No. 48, pp. 14316-14317 Sep. 2002).

Kottmann et al., "Plasmon resonances of silver nanowires with a nonregular cross section," Physical Review B, vol. 64, pp. 235402-1-235402-10 (2001).

Krenn, "Nanoparticle waveguides: Watching energy transfer," Nature Materials, vol. 2, pp. 210-211 (Apr. 2003).

Lin, et al., "Two-Step Functionalization of Neutral and Positively Charged Thiols onto Citrate-Stabilized Au Nanoparticles," J. Phys. Chem. B., vol. 108, No. 7, pp. 2134-2139, (2004).

Lofton et al., "Mechanisms Controlling Crystal Habits of Gold and Silver Colloids," Advance Functinal Materials, vol. 15, No. 7, pp. 1197-1208 (2005).

McFarland, et al., "Single Silver Nanoparticles as Real-Time Optical Sensors with Zeptomole Sensitivity," Nano Letters, vol. 3, No. 8, pp. 1057-1062, (2003).

Merck & Co., Inc., "The Merck Index," Twelfth Edition, p. 647, (1996).

Ngo et al., "Assemblies of cigar-shaped ferrite nanocrystals: orientation of the easy magnetization axes," Colloids and Surgaces A: Physicochem Eng. Aspects, vol. 228, pp. 107-117 (2003).

Nicewarner-Pena et al., "Submicrometer Metallic Barcodes," Science, Vo. 294, No. 5540, pp. 137-141, Oct. 5, 2001.

Ozmetin, et al., "Kinetic Investigation of Reaction Between Metallic Silver and Nitric Acid Solutions," Chem. Eng. Technol., vol. 23, No. 8, pp. 707-711, (2000).

Pastoriza-Santos, et al., "Synthesis of Silver Nanoprisms in DMF," Nano Letters, vol. 2, No. 8, pp. 903-905, (2002).

Pinchuk, et al., "Substrate Effect on the Optical Response of Silver Nanoparticles," Nanotechnoogy, vol. 15, pp. 1890-1896 (2004).

Porter, L. et al., Controlled Electroless Deposition of Noble Metal Nanoparticle Films on Germanium Surfaces, Nano Letters, vol. 2, No. 10, pp. 1067-1071 (Sep. 7, 2002).

Prokes, et al., "Novel Methods of Nanoscale Wire Formation," MRS Bulletin, pp. 13-19, (Aug. 1999).

Sau et al., "Room Temperature, High-Yield Synthesis of Multiple Shapes aof Gold Nanoparticles in Aqueous Solution," J. Am. Chem. Soc., vol. 126, No. 28, pp. 8648-8649 (2004).

Sexton, et al., "Vibrational Spectra of Molecular and Atomic Oxygen on Ag(IIO)," Chemical Physical Letters, vol. 76, No. 2, pp. 294-297, (Dec. 1, 1980).

Sherry, et al., "Localized Surface Plasmon Resonance Spectroscopy of Single Silver nanocubes," Nano Letters, vol. 5, No. 10, pp. 2034-2038, published on Web Aug. 27, 2005.

Silvert, et al., "Preparation of colloidal silver dispersions by the polyol process. Part 1—Synthesis and characterization," J Mater Chem, 6:573-577, (Jan. 1996).

Silvert, et al., "Preparation of colloidal silver dispersions by the polyol process. Part 2—Mechanism of particle formation," J Mater Chem, 7(2):293-299; (1997).

Smith, et al., "Dynamic Atomic-Level Rearrangements in Small Gold Particles," Science, vol. 233, No. 4766, pp. 872-875, (Aug. 22, 1986).

Sosa, et al., "Optical Properties of Metal Nanoparticles with Arbitrary Shapes," J. Phys. Chem. B., vol. 107, No. 26, pp. 6269-6275, (2003).

Spitsyn et al., "Some Characteristics of the Process of Oxidizing Uranium by Tervalent Iron Ions," Atomnaya Energiya, vol. 17, No. 2, (Aug. 1964) pp. 119-123 (original), pp. 827-831 (Englishlanguage translation) [Only the English translation is provided].

Sun et al., "Crystalline Silver Nanowires by Soft Solution Processing," Nano Letters, vol. 2, No. 2, 165-168, (2002).

Sun et al., "Gold and silver nanoparticles: A class of chromophores with colors tunable in the range from 400 to 750 nm," Analyst, 128:686-691, (Apr. 2003).

Sun et al., Large-Scale Synthesis of Uniform Silver Nanowires Through a Soft, Self-Seeding, Polyol Process, Advanced Materials, 14, No. 11, Jun. 5 pp. 833-837, (2002).

Sun et al., "Mechanistic Study on the Replacement Reaction Between Silver Nanostructure and chloroauric Acid in Aqueous Medium," J. Am. Chem. Soc , 2004, 126, pp. 3892-3901.

Sun et al., "Multiple-Walled Nanotubes Made of Metals," Communication to Advanced Materials (Jul. 2003).

Sun et al., "Shape-Controlled Synthesis of Gold and Silver Nanoparticles," Science, vol. 298, pp. 2176-2179, (Dec. 13, 2002).

Sun et al., "Template-Engaged Replacement Reaction: A One-Step Approace to the Large-Scale Synthesis of Metal Nanostructures with Hollow Interiors," Nano Letters, vol. 2, No. 5, pp. 481-485 (Feb. 21, 2002).

Sun et al., Uniform Silver Nanowires Synthesis by Reducing AgN03 with Ethylene Glycol in the Presence of Seeds and Poly(Vinyl Pyrrolidone), Chem. Mater., 14, 4736-4745, (2002).

Wachs, I.E., "Extending Surface Science Studies to Industrial Reaction Conditions: Mechanism and Kinetics of Methaol Oxidation Over Silver Surfaces," Surface Science, vol. 544, No. 1, pp. 1-4 (2003).

Wang, et al., "Transmission Electron Microscopy of Shape-Controlled Nanocrystals and Their Assemblies," J. Phys. Chem. B, vol. 104, No. 6, pp. 1153-1175, (2000).

Wiley et al., Right Bipyramids of Silver: A New Shape Derived from Single Twinned Seeds, Nano Letters, vol. 6., No. 4, pp. 765-768 (2006) (manuscript).

Wiley et al., "Shape-Controlled Synthesis of Silver and Gold Nanostructures," MRS Bulletin, vol. 30, No. 5, pp. 353-361 (May 2005).

Wu et al., "Superconfucting MgB2 Nanowires," Advance materials, vol. 13, No. 19, pp. 1487-100. 1489 (2001).

Xia et al., One-Dimensional Nanostructures: Synthesis, Characterization, and Applications,: 101. Advance Materials, vol. 15, No. 5. pp. 353-389 (2003).

Xiong et al., "Size-Dependence of Surface Plasmon Resonance and Oxidation for Pd Nanocubes Synthesized via a Seed Etching Process," Nano Letters, vol. 5, No. 7, pp. 1237-1242, Published on Web Jun. 3, 2005 (and supporting document).

Yener, et al., "Synthesis of Nanosized Silver Platelets in Octylamine-Water Bilayer Systems," Langmuir, vol. 18, No. 22, pp. 8692-8699, (2002).

(56) References Cited

OTHER PUBLICATIONS

Yguerabide et al., "Light-Scattering Submicroscopic Particles as Highly Fluorescent Analogs and Their Use as Tracer Labels in Clinical and Biological Applications," Analytical Biochemistry, vol. 262, Article No. AB982759, pp. 137-156 (1998).
Zetisu, et al., "Synthesis, Stability and Surface Plasmonic Properties of Rhodium Multipods and Their Use as Substrates for Surface-Enhanced Raman Scattering," Angewandte Chemie Int. Ed., vol. 45, No. 8, pp. 1288-1292 (2005).
Zhang, et al., "DPN-Generated Nanostructures Made of Gold, Silver, and Palladium," Chem Mater, vol. 16, No. 8, pp. 1480-1484, (2004).
Zhang, et al.,"PVP Protective Mechanism of Ultrafine Silver Powder Synthesized by Chemical Reduction Processes," J Solid State Chem, 121(1):105-110, (Jan. 1996).
Notice to File Missing Parts dated Mar. 18, 2004, from U.S. Appl. No. 10/732,910.
Notice of Incomplete Reply dated Jul. 26, 2004, from U.S. Appl. No. 10/732,910.
Response to Notice of Incomplete Reply dated Sep. 20, 2004, from U.S. Appl. No. 10/732,910.
Preliminary Amendment dated May 18, 2005, from U.S. Appl. No. 10/732,910.
Restriction Requirement dated Mar. 23, 2007, from U.S. Appl. No. 10/732,910.
Response to Restriction Requirement dated May 29, 2007, from U.S. Appl. No. 10/732,910.
Office Action dated Jun. 22, 2007, from U.S. Appl. No. 10/732,910.
Response to Office Action dated Nov. 21, 2007, from U.S. Appl. No. 10/732,910.
Office Action dated Feb. 5, 2008, from U.S. Appl. No. 10/732,910.
Response to Office Action dated Aug. 5, 2008, from U.S. Appl. No. 10/732,910.
Interview Summary dated Aug. 11, 2008, from U.S. Appl. No. 10/732,910.
Final Office Action dated Oct. 21, 2008, from U.S. Appl. No. 10/732,910.
Response to Office Action dated Feb. 23, 2009, from U.S. Appl. No. 10/732,910.
Notice of Allowance dated Apr. 27, 2009, from U.S. Appl. No. 10/732,910.
Supplemental Notice of Allowance dated Jun. 11, 2009, from U.S. Appl. No. 10/732,910.
Application for PTA mailed Nov. 9, 2009, from U.S. Appl. No. 10/732,910.
Decision on Request for PTA dated Mar. 9, 2010, from U.S. Appl. No. 10/732,910.
Notice to File Missing Parts dated Sep. 15, 2005, from U.S. Appl. No. 11/197,745.
Response to Notice to File Missing Parts dated Nov. 14, 2005, from U.S. Appl. No. 11/197,745.
Office Action dated Feb. 15, 2008, from U.S. Appl. No. 11/197,745.
Response to Office Action dated Aug. 15, 2008, from U.S. Appl. No. 11/197,745.
Office Action dated Dec. 3, 2008, from U.S. Appl. No. 11/197,745.
Response to Office Action dated Apr. 3, 2009, from U.S. Appl. No. 11/197,745.
Final Office Action dated Jul. 30, 2009, from U.S. Appl. No. 11/197,745.
Response to Office Action dated Feb. 1, 2010, from U.S. Appl. No. 11/197,745.
Office Action dated Apr. 13, 2010, from U.S. Appl. No. 11/197,745.
Response to Office Action dated Aug. 13, 2010, from U.S. Appl. No. 11/197,745.
Office Action dated Oct. 28, 2010, from U.S. Appl. No. 11/197,745.
Response to Office Action dated Mar. 2, 2011, from U.S. Appl. No. 11/197,745.
Final Office Action dated May 6, 2011, from U.S. Appl. No. 11/197,745.
Response to Office Action dated Aug. 2, 2011, from U.S. Appl. No. 11/197,745.
Notice of Allowance dated Oct. 13, 2011, from U.S. Appl. No. 11/197,745.
Preliminary Amendment dated Mar. 19, 2008, from U.S. Appl. No. 11/701,974.
Restriction Requirement dated Feb. 9, 2009, from U.S. Appl. No. 11/701,974.
Office Action dated Sep. 29, 2009, from U.S. Appl. No. 11/701,974.
Response to Office Action dated Mar. 29, 2010, from U.S. Appl. No. 11/701,974.
Notice of Allowance dated May 27, 2010, from U.S. Appl. No. 11/701,974.
Notice of Allowance dated Sep. 9, 2010, from U.S. Appl. No. 11/701,974.
Office Action dated Dec. 21, 2010, from U.S. Appl. No. 11/701,974.
Response to Office Action dated Jun. 20, 2011, from U.S. Appl. No. 11/701,974.
Office Action dated Sep. 6, 2011, from U.S. Appl. No. 11/701,974.
Restriction Requirement dated Apr. 20, 2010, from U.S. Appl. No. 12/509,873.
Response to Restriction Requirement dated May 20, 2010, from U.S. Appl. No. 12/509,873.

* cited by examiner

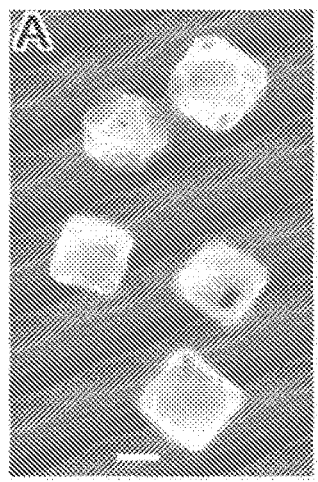
Fig. 6A
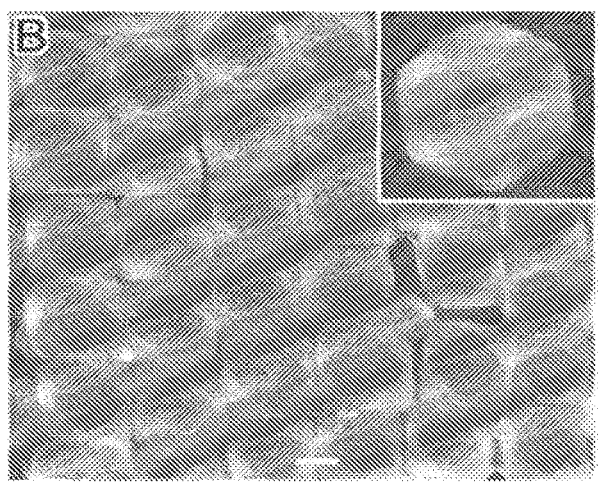
Fig. 6B
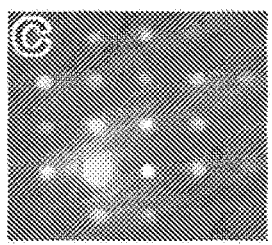 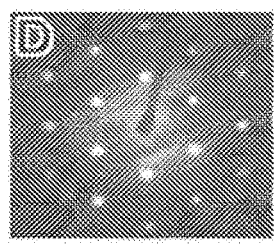
Fig. 6C          Fig. 6D —100 nm —100 nm —100 nm —100 nm —100 nm —100 nm —100 nm —100 nm —100 nm —100 nm —100 nm —50 nm —50 nm

METHODS OF NANOSTRUCTURE FORMATION AND SHAPE SELECTION

RELATED APPLICATIONS

This application is a continuation of U.S. application Ser. No. 14/919,515 filed Oct. 21, 2015, which is a continuation of U.S. application Ser. No. 12/509,873 filed Jul. 27, 2009, which is a divisional of U.S. patent application Ser. No. 10/732,910, filed on Dec. 9, 2003, which claims the benefit of U.S. Provisional Application No. 60/432,098, filed on Dec. 9, 2002. The entire contents of each of the foregoing applications are hereby incorporated by reference herein.

STATEMENT REGARDING FEDERALLY SPONSORED RESEARCH OR DEVELOPMENT

This invention was developed under support from the Office of Naval Research (grant N-0014-01-1-0976), "Self-Assembly Approaches to 3D Photonic Crystals" and a Career Award from NSF (grant DMR-9983893), "Nanostructured Surfaces and Materials"; the Government has certain rights in the invention.

BACKGROUND OF THE INVENTION

Metal nanoparticles play important roles in many different areas. For example, they can serve as a model system to experimentally probe the effects of quantum-confinement on electronic, magnetic, and other related properties. They have also been widely exploited for use in photography, catalysis, biological labeling, photonics, optoelectronics, information storage, surface-enhanced Raman scattering (SERS), and formulation of magnetic ferrofluids. The intrinsic properties of a metal nanoparticle are mainly determined by its size, shape, composition, crystallinity, and structure (solid versus hollow). In principle, any one of these parameters can be controlled to fine-tune the properties of this nanoparticle. For example, the plasmon resonance features of gold or silver nanorods have been shown to have a strong dependence on the aspect-ratios of these nanostructures. The sensitivity of surface-enhanced Raman scattering (SERS) has also been demonstrated to depend on the exact morphology of a silver nanoparticle.

Many metals can now be processed into monodisperse nanoparticles with controllable composition and structure, and sometimes can be produced in large quantities through solution-phase methods. Despite this, the challenge of synthetically controlling the shape of metal nanoparticles has been met with limited success. On the nanometer scale, metals (most of them are face-centered cubic ("fcc")) tend to nucleate and grow into twinned and multiply twinned particles with their surfaces bounded by the lowest-energy {111} facets. Other morphologies with less stable facets have only been kinetically achieved by adding chemical capping reagents to the synthetic systems. For examples, triangular nanoplates of gold have been synthesized by reducing chloroauric acid with citric acid (rather than sodium citrate) and by adding sodium hydroxide solution toward the end of this reaction. Silver nanoprisms in large quantities have also been prepared through a photo-induced approach in which small silver nanospheres transform to nanoprisms with the help of citrate and a co-ligand such as bis(p-sulfonatophenyl) phenylphosphine dehydrate dipotassium.

When a metal nanostructure is processed into a hollow entity, its performance can be further improved due to its relatively lower density and higher surface area than its solid counterpart. For instance, hollow nanoshells made of palladium have been shown to be an effective, well recoverable catalyst for Suzuki coupling reactions, while the monodisperse solid palladium nanoparticles greatly lose their catalytic ability after a single use.

Hollow nanostructures made of metals can be fabricated by depositing a thin layer of metal (or its precursor) on an existing solid nanostructure (e.g., silica beads and polymeric latexes) followed with the calcinations or chemical etching to remove the templates. However, a procedure for manufacturing hollow nanostructures with smooth, nonporous surfaces, homogenous, highly crystalline walls and structural integrity is needed.

Additional aspects and advantages of this invention will be apparent from the following detailed description of preferred embodiments, which proceeds with reference to the accompanying drawings.

BRIEF DESCRIPTION OF THE DRAWINGS

FIG. 6A shows an SEM image of silver nanocubes, such as those shown in FIGS. 2A-2D, following reaction with an insufficient amount of aqueous solution of chloroauric acid.

FIG. 6B shows electron diffraction patterns of two gold/silver alloyed nanoboxes with their square and triangular facets oriented perpendicular to the electron beam, respectively.

FIGS. 6C and 6D show electron diffraction patterns of individual nanoboxes sitting on TEM grids against one of their square and triangular faces, respectively.

DETAILED DESCRIPTION

I. The Formation of Silver Nanostructures

Silver nanostructures of various shapes can be formed by the reduction of silver nitrate with ethylene glycol in the presence of poly(vinyl pyrrolidone) ("PVP"). The morphology and dimensions of the product depend on reaction conditions, including temperature, the concentration of silver nitrate, and the molar ratio between the repeating unit of PVP and silver nitrate. The methods described herein provide nanostructures with high uniformity in sizes, controllable size and shape, single crystallinity, large quantities, and good dispersibility in variable solvents. Uniform hollow nanostructures can be generated by reacting the silver nanostructures with other metal precursors, such as chloroauric acid ($HAuCl_4$), paladium nitrate ($Pd(NO_3)_2$) or platinum acetate ($Pt(CH_3COO)_2$. The formation of hollow nanostructures is discussed in more detail below. Nanostructures surrounded by a shell (a rattle-like structure) may be formed by plating solid or hollow nanostructures and reacting the plating with another metal salt. The generation of the core/shell structures is discussed in more detail below.

Figure 1:
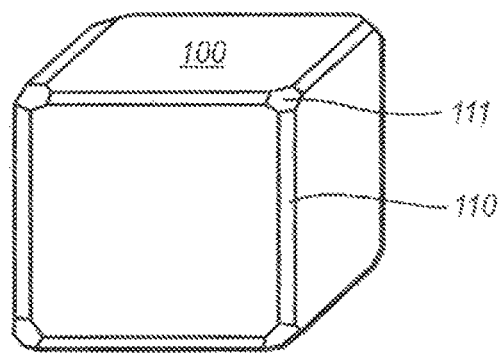
FIG. 1 is an illustration of a silver nanocube manufactured by the methods described herein with facets {100}, {111} and {110}.
Figure 2A:
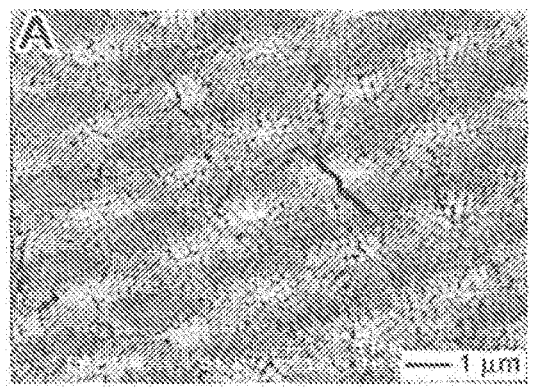
FIGS. 2A and 2B show low- and high-magnification SEM images of slightly truncated silver nanocubes synthesized with the present approach.
Figure 2B:
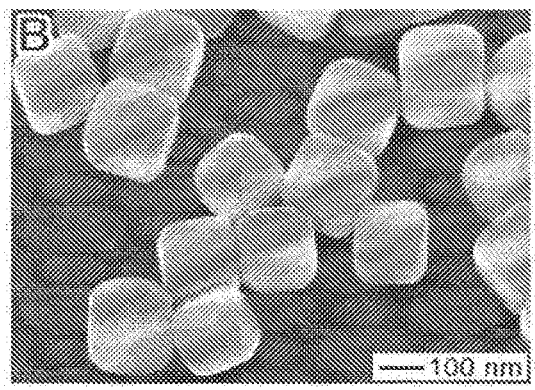

FIG. 1 is an illustration of a silver nanocube generated by the methods described herein with facets {100}, {111} and {110}. FIGS. 2A and 2B show SEM images of a typical sample of silver nanocubes obtained by adding silver nitrate in ethylene glycol at a concentration of 0.25 mol/dm$^3$ and PVP in ethylene glycol at a concentration of 0.375 mol/dm$^3$ to heated etheylene glycol and allowing the reaction to proceed at a reaction temperature of 160° C. The injection time was 8 min, the unit of volume was one milliliter (mL) and the reaction time was 45 minutes. The formation of silver nanocubes is described in more detail in connection with Example 1 below.

Figure 2C:
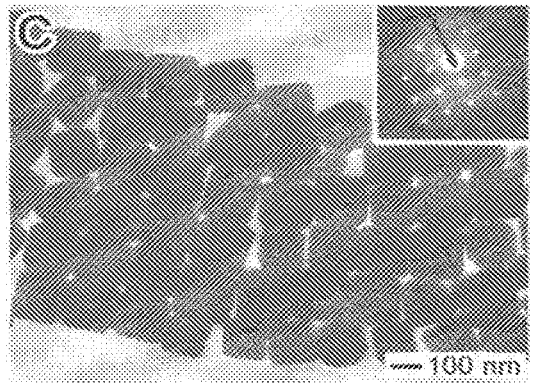
FIG. 2C shows a TEM image of the same batch of silver nanocubes shown in FIGS. 2A and 2B. The inset shows the electron diffraction pattern obtained by directing the electron beam perpendicular to one of the square faces of a cube.

FIGS. 2A and 2B indicate the large quantity and good uniformity that were achieved. The silver nanocubes had a mean edge length of 175 nm with a standard deviation of 13 nm. Their surfaces were smooth, nonporous and some of them self-assembled into ordered two-dimensional arrays on the silicon substrate when the scanning electron microscopy ("SEM") sample was prepared. All corners and edges of the nanocubes were slightly truncated, as can be seen in FIG. 2B. The image shown in FIG. 2B was taken at a tilting angle of 20°. FIG. 2C shows a transmission electron microscopy ("TEM") image of an array of silver nanocubes self-assembled on the surface of a TEM grid. The inset shows the electron diffraction pattern obtained by directing the electron beam perpendicular to one of the square faces of a cube. The square symmetry of this pattern indicates that each silver nanocube was a single crystal bounded mainly by {100} facets. On the basis of these SEM and TEM studies, it is clear that the slightly truncated nanocube can be described by the drawing shown in FIG. 1.

Figure 2D:
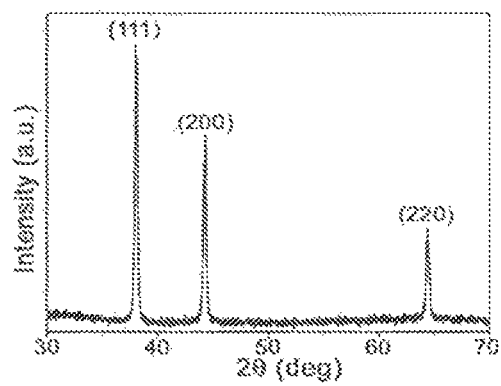
FIG. 2D shows an XRD pattern of the same batch of sample shown in FIGS. 2A-2C.

FIG. 2D shows the x-ray diffraction (XRD) pattern recorded from the same batch of sample shown in FIGS. 2A-2C. The peaks were assigned to diffraction from planes (111), (200) and (220) of fcc silver nanocubes. The ratio between the intensities of 200 and 111 diffraction peaks was higher than the conventional value (0.67 versus 0.4), indicating that nanocubes manufactured as described herein are abundant in {100} facets. Thus their (100) planes tend to be preferentially oriented (or textured) parallel to the surface of the supporting substrate. The ratio between the intensities of (220) and (111) peaks was also slightly higher than the conventional value (0.33 versus 0.25) due to the relative abundance of {110} facets on the surfaces of our silver nanocubes.

The dimensions of silver nanostructures could be controlled by varying growth time. The silver nanocubes described above in connection with FIGS. 2A-2D were formed over a reaction time of 45 minutes had an average edge length of 175 nm.

Figure 3A:
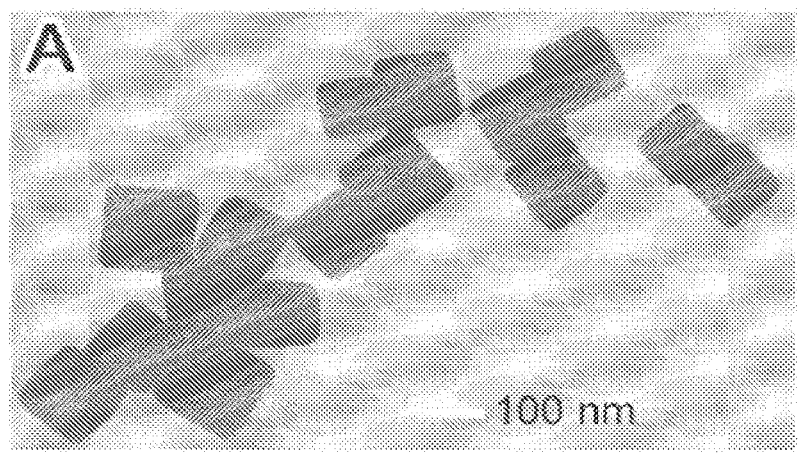
FIGS. 3A and 3B show TEM images of silver nanocubes synthesized under the same conditions as in FIGS. 2A-2D except that the growth time was 17 minutes for FIG. 3A and 14 minutes for FIG. 3B.
Figure 3B:
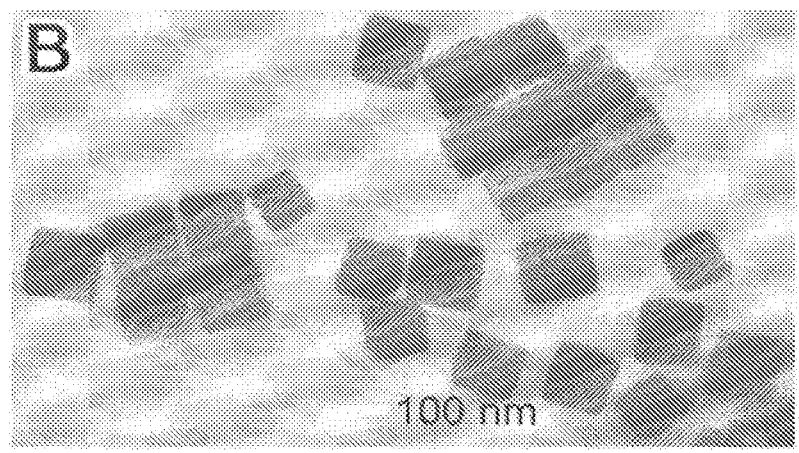

FIGS. 3A and 3B show TEM images of silver nanocubes synthesized under the same conditions as the nanocubes shown in FIGS. 2A-2D except that the growth time was shortened from 45 to 17 minutes (FIG. 3A) and to 14 minutes (FIG. 3B). A growth time of 17 minutes obtained nanocubes with average edge lengths of 115 nm. A growth time of 14 minutes resulted in nanocubes with average edges lengths of 95 nm.

Figure 4:
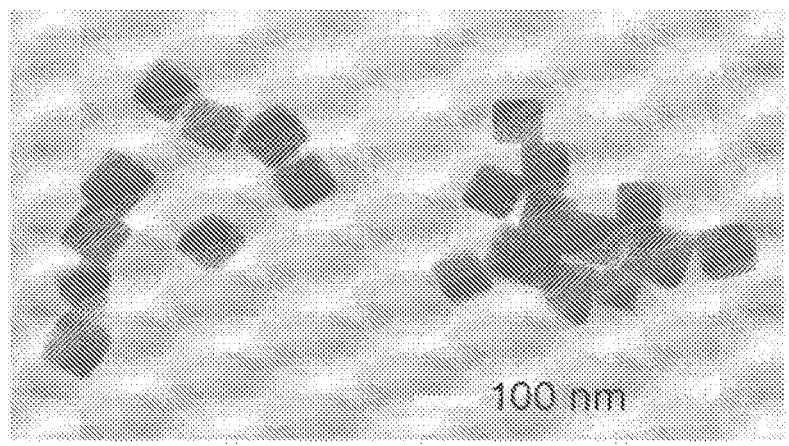
FIG. 4 shows a TEM image of silver nanocubes synthesized under the same conditions as in FIGS. 2A-2D except that the concentration of silver nitrate was 0.125 mol/dm$^3$ and the growth time was 30 min.

FIG. 4 shows a TEM image of silver nanocubes synthesized under the same conditions as in FIGS. 2A-2D except that the concentration of silver nitrate had been reduced from 0.25 mol/dm$^3$ to 0.125 mol/dm$^3$ and the growth time had been shortened to 30 minutes. The average edge length was 80 nm. These results demonstrate that it is possible to tune the size of silver nanocubes by controlling the growth conditions.

Varying reaction conditions can select for nanostructures with different shapes. Once a desired shape is identified, the nanostructures may be formed under condition optimized to yield the desired shape at a higher percentage than any other nanostructure shape. The nanostructures of the desired shape may then be separated from nanostructures of the other shapes by centrifugation (gravity) or by filtration.

Crystalline silver nanocubes may be obtained when under the following reaction conditions: (1) the initial concentration of silver nitrate in ethylene glycol ranges from about 0.1 mol/dm$^3$ to about 0.3 mol/dm$^3$; (2) the molar ratio of PVP to silver nitrate ranges from about 1.5 to about 3; (3) the PVP used has a molecular weight ranging from about 40,000 to about 1,300,000; (4) the growth time ranges from about 10 minutes to about 60 minutes; and (5) reaction temperatures ranges from about 155° C. to about 175° C. These reaction conditions may depend on one another. For example, when the molar ratio of PVP to silver nitrate is 3, the concentration of silver nitrate used to obtain silver nanocubes is 0.125 mol/dm$^3$. In another example, when the molar ratio is 1.5, the concentration of silver nitrate used to obtain silver nanocubes is 0.25 mol/dm$^3$. Specific methods for generating different silver nanostructures are discussed in more detail in connection with Examples 1-4 below.

Figure 5:
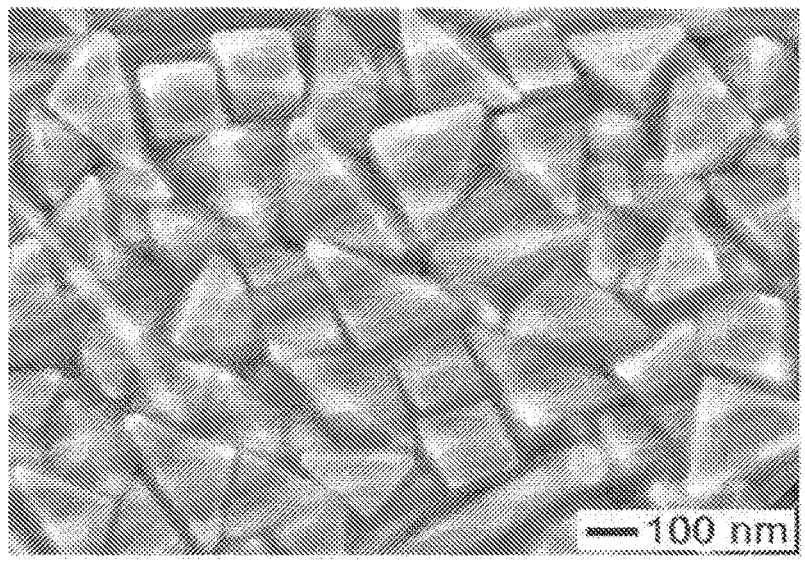
FIG. 5 shows an SEM image of nanopyramids formed under the same conditions as the nanocubes of FIGS. 2A-2C except that the reaction temperature was decreased to 100° C. and the growth time elongated to 5 hours.

Half-cubes or pyramids may be obtained by similar conditions: (1) a silver nitrate concentration of about 0.25 mol/dm$^3$; (2) a ratio of PVP to silver nitrate of about 1 to about 4; (3) a PVP molecular weight ranging from about 40,000 to about 1,300,000; (4) a reaction temperature of about 90° C. to about 110° C.; and (5) a growth time of about 4 to about 10 hours. FIG. 5 shows an SEM image of a sample of pyramids formed at a reaction temperature of about 100° C. and a growth time of 5 hours.

Silver nanowires may be obtained under the following reaction conditions: (1) a concentration of silver nitrate of less than about 0.1 mol/dm$^3$; (2) ratio of PVP to silver nitrate ranging from about 1 to about 10; (3) PVP molecular weight ranging from about 20,000 to about 1,300,000; (4) a reaction temperature ranging from about 150° C. to about 190° C.; and (5) a growth time ranging from about 20 to about 60 minutes.

Multiply twinned particles were obtained under the condition described above for forming nanocubes except that the molar ratio between the repeating unit of PVP and silver nitrate was increased from 1.5 to 3. If the ratio of PVP to silver nitrate approaches 3, then a silver nitrate concentration of about 0.25 mol/dm$^3$ can be used to form multiply twinned particles.

Spherical silver nanoparticles were also synthesized using the polyol process. In a typical synthesis, 0.025 g silver nitrate (99+%, Aldrich) and 0.10 g PVP (molecular weight of about 55,000, Aldrich) were dissolved in 10 mL anhydrous ethylene glycol (99.8%, Aldrich) at room temperature. The mixture was heated at 160° C. for 1.5 hours while it was vigorously stirred. The average diameter of these particles was 75 nm. The diameter of the particles could be controlled by changing the concentrations of silver nitrate and PVP. The amount of silver nitrate for forming spherical silver nanoparticles used in the volumes disclosed above ranges from about 0.01 grams to about 1.0 grams. The amount of PVP for forming spherical silver nanoparticles used in the volumes disclosed above ranges from about 0.05 about 2 grams. The diameter of silver nanospheres made by this process can be tuned in the range of about 20 nm to about 300 nm.

The shape of an fcc nanocrystal is mainly determined by the ratio (R) between the growth rates along<100> and <111> directions. Octahedra and tetrahedra bounded by the most stable planes {111} will be formed when R=1.73 and perfect cubes bounded by the less stable planes {100} will result if R is reduced to 0.58. For the slightly truncated nanocube illustrated in FIG. 1, the ratio R should have a value close to about 0.7. If PVP is not present, reducing silver nitrate with ethylene glycol forms multiply twinned particles bounded by the most stable {111} facets. When PVP is introduced, it is believed that the selective interaction between PVP and various crystallographic planes of fcc silver could greatly reduce the growth rate along<100> and/or enhance the growth rate along<111>, and thus reduce R from 1.73 to 0.7. Both Fourier Transform Infrared Spectroscopy and X-Ray Photoelectron Spectroscopy measurements indicate that there exists a strong interaction between the surfaces of silver nanoparticles and PVP through coordination bonding with the O and N atoms of pyrrolidone ring, albeit the exact bonding geometry and the nature of the selectivity between different crystallographic planes are still not clear.

The synthetic strategy presented here to prepare silver nanocubes should be extendable to other metals since ethylene glycol can reduce a broad range of metallic salts to generate metals, including noble metals (e.g., gold, platinum, palladium and copper), magnetic metal (e.g., iron, cobalt and nickel) and some superconductive metals (e.g., lead). The major requirement seems to be the availability of an appropriate polymer that will be capable of forming coordination compounds with these metal ions and can selectively adsorb onto different surfaces of these metals.

II. Formation of Hollow Nanostructures

Hollow nanostructures of other metals, such as gold/silver, platinum/silver and palladium/silver alloys, may be formed by using silver nanostructures or nanostructures of other metals as sacrificial templates. This method yields hollow nanostructure with a single manufacturing step. The hollow nanostructures can be selected to have substantially nonporous walls or can be selected to have porous walls. If desired, the hollow nanostructures yielded by this method can also have smooth, nonporous surfaces, homogenous, highly crystalline walls and structural integrity. There are two requirements in obtaining a hollow metal nanostructure of a particular metal or alloy: the proper solvent and a salt that can be reduced by the nanometer-sized templates. For example, silver nanocubes may be used as sacrificial templates to generate gold/silver alloy nanoboxes with a well-defined shape and hollow structure, based on the following reaction:

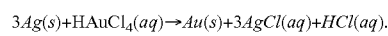

$3Ag(s)+HAuCl_4(aq) \rightarrow Au(s)+3AgCl(aq)+HCl(aq)$.

Based on this stoichiometric relationship, silver nanocubes, for example, can be converted into soluble species and leave behind a gold/silver alloy in the form of nanoboxes. The resulting structures may be selected to be nanoboxes with solid walls or nanocages with porous walls, depending on the amount of HAuCl$_4$ added to the silver nanocubes.

In one embodiment, the method of preparing hollow nanostructures comprises: (1) obtaining a solution of solid nanostructures comprising at least one metal; (2) selecting a salt of a second metal, wherein the first metal can reduce the salt; (3) blending a sufficient amount of the salt with the solid nanostructure solution to enable the formation of hollow nanostructures. These hollow nanostructures are formed by a replacement reaction between the metal salt and the metal in the solid nanostructure.

Two successive, distinctive processes are involved in this replacement reaction. The first process involves the combination of dissolution of silver templates and alloying between deposited gold layers and silver, together with the formation of seamless nanostructures that have hollow interiors and uniform walls composed of gold/silver alloy. The second process involves the dealloying, which is associated with the morphological reconstruction as well as the generation of pinholes in the walls. For example, in the first step of the reaction between silver nanocubes and HAuCl$_4$ solution, the silver nanocubes were transformed into pinhole-free nanoboxes. In the second step, the dealloying process selectively dissolved silver atoms of the Au/Ag wall and lattice vacancies were generated in the wall. The Ostwald ripening process could rearrange these lattice defects, resulting in the formation of truncated nanoboxes and porous nanoboxes (nanocages).

FIG. 6A shows an SEM image of a sample of 5 mL of solution containing silver nanucubes at a concentration of about $4\times10^9$ particles/mL after reaction with 0.3 mL of aqueous $1\times10^{-3}$ mol/dm$^3$ HAuCl$_4$ solution, which was an insufficient amount of HAuCl$_4$. The black spots represent pinholes in their surfaces where no gold had been deposited through the replacement reaction. It is believed that the existence of such pinholes allows for the transport of chemical species into and out of the gold/silver boxes until the boxes became seamless. The locations of these black spots implied that the replacement reaction occurred on the surface of a template in the following order: {110}, {100}, and {111} facets. This sequence was consistent with the order of free energies associate with these crystallographic planes: $Y_{\{110\}} > Y_{\{100\}} > Y_{\{111\}}$. Additional SEM images showing the formation of nanoboxes by this process are discussed in connection with Example 8.

FIG. 6B shows an SEM image of sample of 5 mL of solution containing silver nanucubes at a concentration of about $4\times10^9$ particles/mL following reaction with 1.5 mL of aqueous $1\times10^{-3}$ mol/dm$^3$ HAuCl$_4$ solution. The gold/silver nanoboxes shown in FIG. 6B self-assembled into a close packed two-dimensional array during sample preparation. The size of these gold boxes increased by about 20% compared with that of the silver templates. This increase in size was in agreement with the shell thickness calculated from stoichiometric and geometric arguments. The gold/silver nanoboxes were finished with smooth surfaces, and most of them (>95%) were free of irregularities such as pinholes. Stated otherwise, the gold/silver alloy nanoboxes were substantially non-porous. Each box was bounded by two sets of facets (eight triangular and six square ones), and any one of these facets could lie against a solid substrate. The inset of FIG. 6B shows the SEM image of an individual box sitting on a silicon substrate against one of its triangular facets, illustrating the high symmetry of this polyhedral, hollow nanoparticle. The crystallinity and structure of these nanoboxes were examined using electron diffraction.

FIGS. 6C and 6D show electron diffraction of nanoboxes sitting on TEM grids against one of their square and triangular faces, respectively. These diffraction spots suggest that each nanobox was a single crystal, with its square facets being indexed to {100} planes and triangular ones to {111} planes. These observations suggest that an epitaxial relationship exists between the surfaces of the silver cubes and those of gold/silver alloyed boxes that greatly facilitated the transformation from the single crystalline templates to the single crystalline products. Minor reconstruction also occurred in the replacement process: for example, the {110} planes that were observed as ridges on the surfaces of silver cubes disappeared and the areas of {111} and {100} facets were enlarged and reduced, respectively.

Figure 7A:
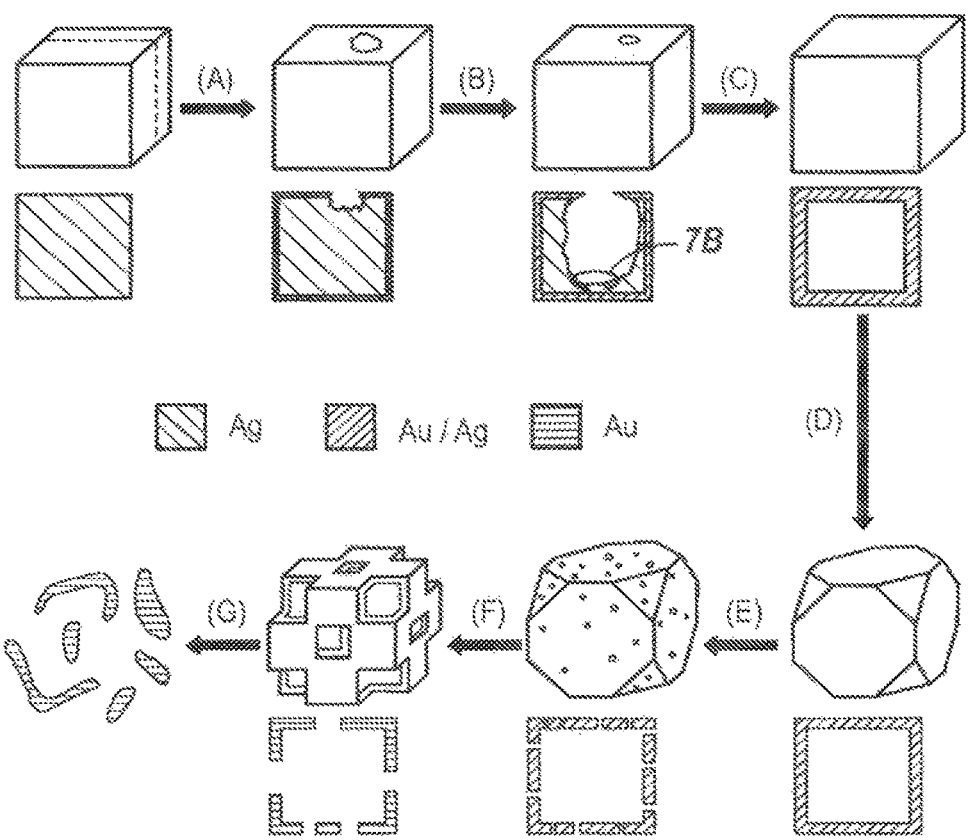
FIG. 7A is a diagram of the procedure for manufacturing nanoboxes from silver nanocubes.
Figure 7B:
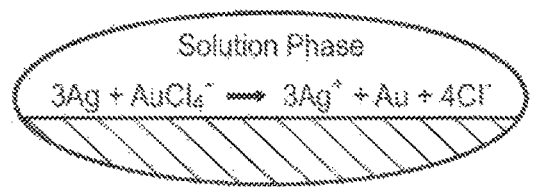
FIG. 7B is a diagram of the reaction that occurs in the replacement process.

FIG. 7 is a schematic illustration of morphological and structural changes involved in the galvanic replacement reaction between a silver nanocube and an aqueous HAuCl$_4$ solution. The major steps can be summarized as the following: (A) initiation of the replacement at a specific spot having relatively high surface energy; (B) continuation of the replacement reaction between Ag and HAuCl$_4$ along with the formation of a partially hollow structure; (C) formation of nanoboxes with uniform, smooth, nonporous, homogeneous walls composed of a Au/Ag alloy; (D) initiation of dealloying and morphological reconstruction of the Au/Ag nanobox; (E, F) continuation of dealloying, together with the formation of small pores in the walls; (G) fragmentation of the porous Au nanobox. The cross section represents the plan along the dashed lines.

Silver nanowires can react with HAuCl$_4$ and display a similar morphological evolution process to the process describe above for nanoboxes. Reaction temperature plays a critical role in the replacement reaction because the dissolvability of AgCl and the diffusion of metals were strongly dependent on temperature. This template-engaged replacement reaction between silver nanostructures and other metals enables the preparation of metal nanostructures with precisely designed geometric constructions. Controlling the morphology of metal nanostructures provides an effective mean to tune their properties. For example, nanostructures with different morphologies formed by reacting the same amount of silver nanocubes and different volumes of HAuCl$_4$ solution could continuously tune their surface plasmon resonance peak over a broad range from 500 to 1200 nm.

Silver templates may be used to generate hollow structures by using other metal ions that can be reduced by silver. For example, palladium/silver and platinum/silver hollow structures can be generated by reacting their salt with silver templates. The reaction for reacting silver with a palladium salt is:

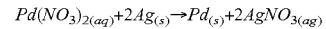
$$Pd(NO_3)_{2(aq)} + 2Ag_{(s)} \rightarrow Pd_{(s)} + 2AgNO_{3(aq)}$$

The reaction for reacting silver to with a platinum salt is:

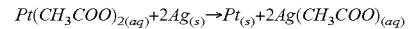
$$Pt(CH_3COO)_{2(aq)} + 2Ag_{(s)} \rightarrow Pt_{(s)} + 2Ag(CH_3COO)_{(aq)}$$

Alternatively, Ni/Co alloy nanoparticles may be used a sacrificial templates for forming hollow nanostructures of other metals or metal alloys. The replacement reaction is based on two equations, one for the conversion of nickel and one for the conversion of cobalt. For example, the two replacement reactions for generating silver or silver/alloy hollow nanoparticles using Ni/Co alloy nanoparticles are:

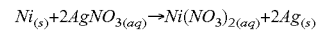
$$Ni_{(s)} + 2AgNO_{3(aq)} \rightarrow Ni(NO_3)_{2(aq)} + 2Ag_{(s)}$$

and

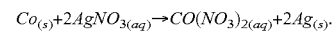
$$Co_{(s)} + 2AgNO_{3(aq)} \rightarrow CO(NO_3)_{2(aq)} + 2Ag_{(s)}.$$

The two replacement reactions for generating gold or gold alloy hollow nanostructures from Ni/Co alloy nanoparticles are:

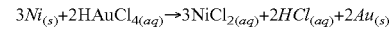
$$3Ni_{(s)} + 2HAuCl_{4(aq)} \rightarrow 3NiCl_{2(aq)} + 2HCl_{(aq)} + 2Au_{(s)}$$

and

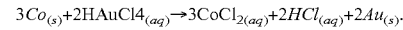
$$3Co_{(s)} + 2HAuCl4_{(aq)} \rightarrow 3CoCl_{2(aq)} + 2HCl_{(aq)} + 2Au_{(s)}.$$

Methods for generating hollow metal nanoparticles using a sacrificial template are discussed in more detail below in connection with Examples 5-13.

III. Complex Nanoshell and Nanotube Formation

Core/shell nanostructures (nanostructures having with cores encapsulated by a nanoshell) can be made by preparing solid nanoparticles, coating the nanoparticles with a layer of a different metal or metal alloy and allowing the coating to be replaced with another metal or metal alloy. Alternatively, multiple walled hollow nanostructures may be formed by using hollow nanostructures, manufactured as described above, as a precursor. The nanostructure core and nanoshell are separated by a space along at least a portion of the circumference of the nanostructure core. In one embodiment, the nanostructure core is unattached to the encapsulating nanoshell and is can move freely within the nanoshell.

Figure 8:
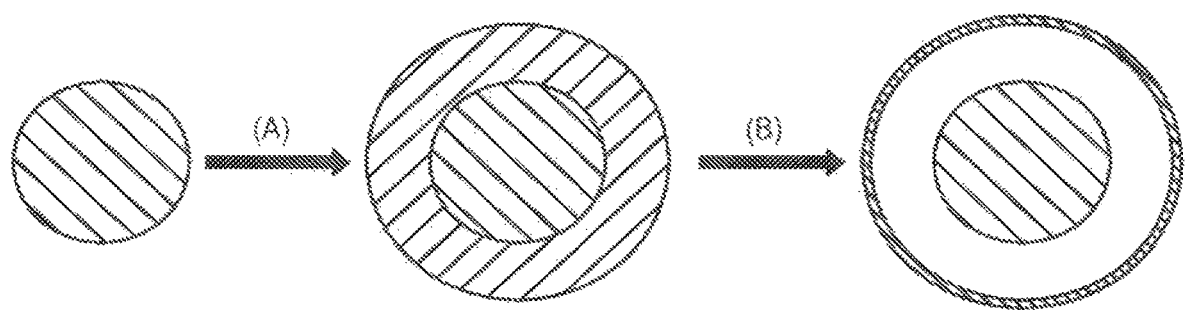
FIG. 8 is a schematic illustration of the formation of movable solid core (Au/Ag alloy) and shell (Au/Ag alloy).

FIG. 8 is a schematic illustration of the formation of movable solid core (gold/silver alloy) and shell (gold/silver alloy). Step (A) shows the plating of a silver layer on the surface of an gold/silver alloyed solid nanoparticle. Step (B) shows the plated silver layer reacting with HAuCl4, resulting in the formation of a rattle-like core/shell structure.

Shell thickness and morphology can be controlled by controlling the volume of $HAuCl_4$ solution added to the dispersion of nanostructures. SEM or TEM images may be taken following the addition of each drop to determine whether the desired shell thickness and morphology has been reached. The spacing between core and shell may also be tuned by changing the concentration of AgNO3 in the silver plating step. The extinction peaks exhibited by these rattle-like core/shell structures may also be tuned by controlling the reaction conditions.

Figure 9A:
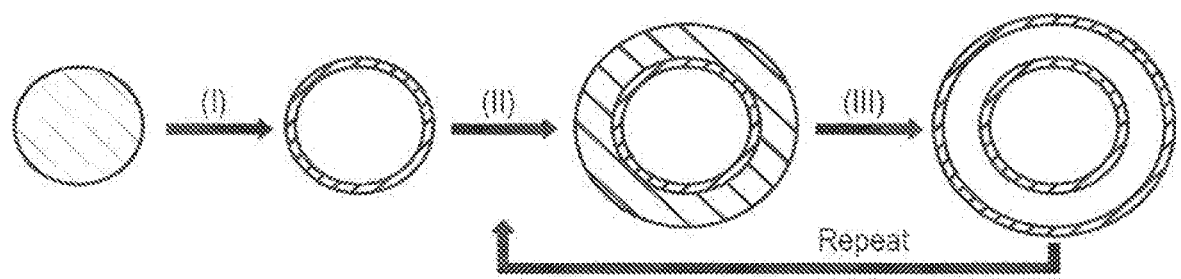
FIG. 9A shows a schematic illustration of the formation of a multiple walled hollow nanoshell.
Figure 9B:
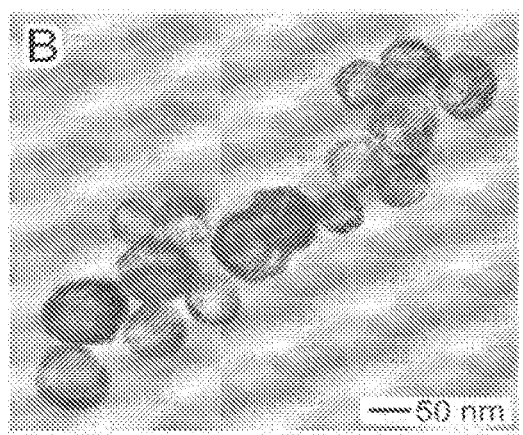
FIG. 9B shows TEM images of nanostructures, each with a core encapsulated by a single nanoshell.
Figure 9C:
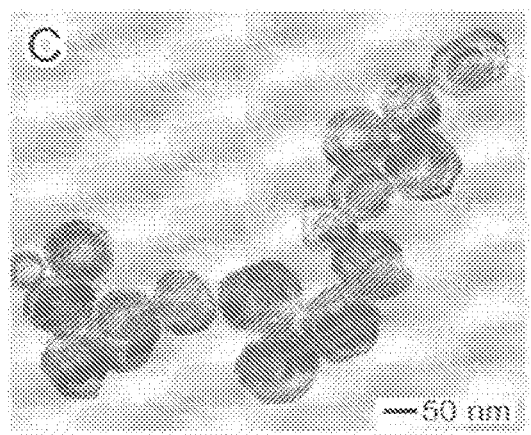
FIG. 9C shows TEM images of nanostructures, each with a core encapsulated by a double nanoshell.
Figure 9D:
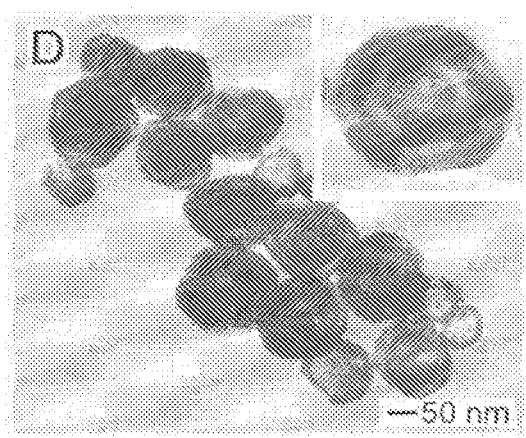
FIG. 9D shows TEM images of nanostructures, each with a core encapsulated by a triple nanoshell.

These rattle-like core/shell nanostructures may be formed with more than one shell surrounding the nanoparticles by repeating the plating and replacement process with a metal salt differing from salt used to create the previous shell. For example, a first nanoshell may be created by plating a Ag/Au allowed solid nanoparticles with silver, then reacting the silver plating with HAuCl4. Additional nanoshell may be added by repeating the process. Alternatively, additional nanoshells may be generated by coating the core/shell particles with silver and then adding a different metal salt, such as $Pd(NO_3)_2$ or $Pt(CH_3COO)_2$. FIG. 9A shows a schematic illustration of the formation of a multiple walled hollow nanoshell. Step (I) represents the formation of a hollow nanostructure as described above. Step (II) shows the plating of the hollow nanostructure and Step (III) represents the replacement reaction of the plating to form a shell. FIG. 9B shows a TEM image of a nanostructures, each with a single nanoshell; FIG. 9C shows a TEM image of nanostructures with double nanoshells, and FIG. 9D shows nanostructures with triple nanoshells formed by this process.

Figure 10:
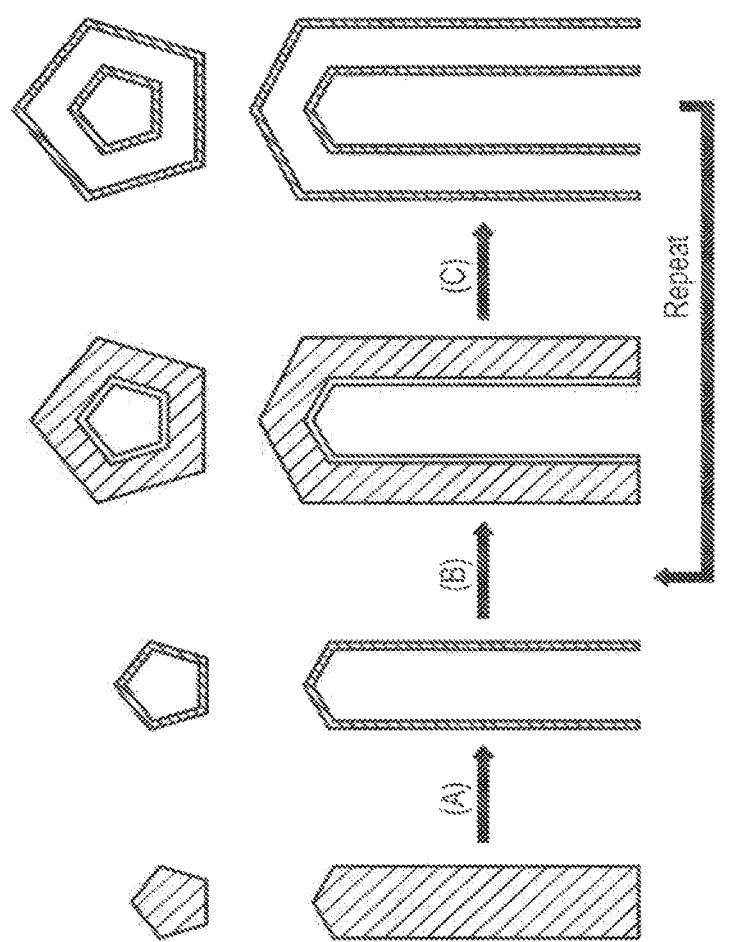
FIG. 10 is a schematic illustration of the formation of hollow nanotubes.

FIG. 10 is a schematic illustration of the formation of hollow nanotubes. Step A shows a silver nanowire reacting with $HAuCl_4$ to form a hollow nanotube whose morphology is complementary to that of the silver nanowire. The resultant nanotube could be coated with a conformal, thin sheath of Ag through an electroless plating process, shown as Step B. After repeating the galvanic replacement reaction, a new tubular wall with slightly larger lateral dimensions would be formed, and a double-walled nanotube was obtained, Step C. Coaxial nanotubes with more than two walls could be readily synthesized by repeating Steps B and C. The thickness of each new wall can be controlled by varying the concentration of $AgNO_3$ solution used for plating silver layers. These nanotubes may serve as substrates for surface-enhanced Raman spectroscopic ("SERS") detection of molecular species with ultra-sensitivity in the spectral region form red to near infrared ("NIR"), which happens to be a transparent window for biological samples.

EXAMPLES

Examples 1-4

Formation of Silver Nanostructures

Example 1

Example 1: A 3-neck glass flask and condenser are immersed in nitric acid bath (V/V=1:4) for 10 h and rinsed with copious water, then dried in the oven at 60° C. All the other glass stuff, including 20-mL liquid scintillation glass vials and disposable pipets, can be cleaned via the same procedure.

The recipes include silver nitrate (silver source), PVP (shape-selective reagent, weight-average molecular weight≈55,000), anhydrous ethylene glycol (both solvent and reducing agent, such as the product from Aldrich, Milwaukee, Wis.).

A solution of PVP can be prepared by dissolving appropriate amount of PVP in anhydrous ethylene glycol with the final concentration of 0.375 mol/dm$^3$ (in terms of repeating unit). For the preparation of a solution of silver nitrate, the calculated amount of silver nitrate (milled into fine powder) is added to anhydrous ethylene glycol, then bubbled with air to accelerate the dissolving process. The silver nitrate should be dissolved completely within 1.5 min with final concentration of about 0.25 mol/dm$^3$.

To form silver nanocubes, a 5 volume of anhydrous ethylene glycol in flask is heated at 160° C. (in oil bath) for 1 hour. A 3 volume of solution of silver nitrate (freshly prepared) and a 3 volume of solution of PVP are simultaneously added into the hot ethylene glycol by means of a two-channel syringe pump over a period of 2-12 min. The solution is continued to heat at 160° C. for another 10 to 60 min. Vigorous magnetic stirring (such as a rotation rate of 400 rpm) is maintained throughout the entire process.

The product can be collected via centrifugation. In this case, the reaction product is diluted with acetone (5-10 times by volume) and centrifuged at 5000 rpm for 15 minutes. The supernatant can be removed using a pipet and the precipitate is redispersed by adding appropriate solvents (such as methanol, ethanol, ethylene glycol, water and their mixtures). In some cases, the product includes some nanorods and nanowires with yield of 5%. The one-dimensional nanostructures with high aspect-ratios can be easily separated from nanocubes through filtration (with Nucleopore® membranes containing pores 1 μm in diameter) because of their large difference in dimension.

The nanocubes are single crystals and are characterized by a slightly truncated shape bounded by {100}, {110} and {111} facets. Their sizes have narrow distribution.

Example 2

Silver nanocubes were prepared by heating 5 mL anhydrous ethylene glycol (99.8%+, Aldrich, Milwaukee, Wis.) in a 100 mL flask (ChemGlass, Vineland, N.J.) at 160° C. for 1 hour. Two solutions were prepared: a 3 mL ethylene glycol solution of silver nitrate (0.25 mol/dm$^3$, 99+% Aldrich) and PVP (0.19 mol/dm3 in terms of repeating unit, Mw≈55,000, Aldrich); and (2) a 3 mL ethylene glycol solution of PVP (0.19 mol/dm$^3$ in terms of repeating unit, $M_w$≈55,000, Aldrich). The two solutions were simultaneously added to the hot ethylene glycol using a two-channel syringe pump (KDS-200, Stoelting Co., Wood Dale, Ill.) at a rate of 0.375 mL/minute. The reaction mixture was then continued with heating at 160° C. for 40 minutes. Magnetic stirring at a rate of about 400 rpm was maintained through the entire synthesis. The product was dominated by cubic nanoparticles, with a small amount (<5%) of nanostructures with other morphologies (e.g., rods, cubooctahedrons, tetrahedrons, and spheres).

Example 3

Silver nanowires were synthesized via the method described above for Example 2 except that 3 mL ethylene glycol solution of silver nitrate (0.085 mol/dm$^3$) and 3 mL ethylene glycol solution of PVP (0.13 mol/dm$^3$) were simultaneously injected, at an injection rage of 0.375 mL/minute, into 5 mL ethylene glycol. The ethylene glycol had been pre-heated at 160° C. before the addition of the solutions of $AgNO_3$ and PVP.

Example 4

Silver nanoparticles with semi-spherical shapes were synthesized by dissolving 0.025 g silver nitrate and 0.10 g PVP in 10 mL ethylene glycol. The mixture was then heated at 160° C. for 1.5 hours while it was vigorously stirred. The silver nanostructures made by the processes described herein could disperse well in water.

Examples 5-13

Formation of Hollow Nanostructures

Example 5

The silver nanocubes formed by the method described in Example 1 can be used as sacrificial templates to generate single-crystalline nanoboxes of gold/silver alloy. The resulting gold/silver alloyed nanoboxes are hollow tetradecahedra bounded by six {100} and eight {111} facets. In a typical procedure, a 5 volume of the aqueous dispersion containing silver nanocubes at a concentration of about 4×109 particles/mL is refluxed for 10 minutes. A 1.5 volume of 1×10$^{-3}$ mol/dm$^3$ aqueous solution of chloroauric acid is added drop-wise to the refluxing solution. This mixture is continuously refluxed until its color became stable. Vigorous magnetic stirring is also maintained throughout the synthesis.

Example 6

Samples of silver nanocubes were prepared by mixing together (1) a 100-µL aliquot of an original dispersion of as-synthesized silver nanocubes, such as those manufactured by the method described above in Example 2, and (2) 5 mL of de-ionized water (purified with cartridges from Millipore, E-pure, Dubuque, Iowa) at room temperature. The diluted dispersion containing silver nanocubes was refluxed for 10 minutes. Aliquots of 1×10$^{-3}$ mol/dm$^3$ HAuCl$_4$ (99.9%, Aldrich) aqueous solution were added dropwise to the refluxing solution. This mixture was continuously refluxed for 20 minutes and the color became stable.

SEM images of the solution were taken following the addition different volumes of HAuCl$_4$ solution to determine the progress of the reaction. Vigorous magnetic stirring was maintained throughout the synthesis. When the solution was cooled down to room temperature, white solid (AgCl precipitate) would settle at the bottom of containers. The AgCl solid could be removed by dissolving with saturated solution of NaCl (99.9%, Fisher, Fairlawn, N.J.). However, in this example NaCl powders were added to the aqueous dispersions of products until the solution was saturated with NaCl. The solution was then transferred to centrifuge tubes and centrifuges at 10,000 rpm for 15 minutes. The supernatant containing the dissolved AgCl was easily removed using a pipet. The settlings were rinsed with water and centrifuged six times for a time of about 10 to about 30 minutes each time. The final solids were dispersed with water.

Example 7

The reaction described above for Example 6 was repeated with 250-µL and 250-µL aliquots for nanowires and spherical nanoparticles, respectively to obtain nanoshells in the shape of nanowires and spherical nanoparticles.

Example 8

Figure 11A:
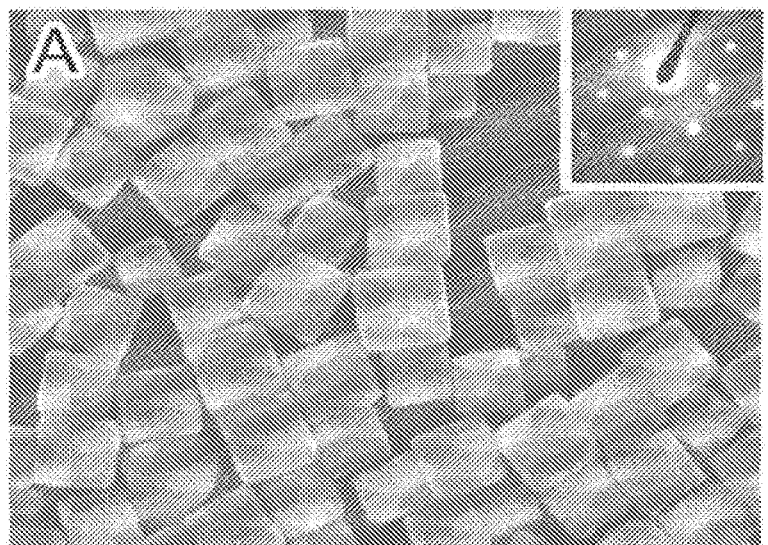
FIG. 11A shows an SEM image sample of silver nanocubes.

Eleven samples were prepared as described above in Example 6. SEM images of each of the eleven samples (shown in FIGS. 11A-11K) were prepared after the addition of differing amounts of HAuCl$_4$ solution to each sample. FIGS. 11A-11K show SEM images of the eleven samples of silver nanocubes following the addition of increasing amounts of 1×10$^{-3}$ mol/dm$^3$ HAuCl$_4$ solution. FIG. 11A shows an SEM image sample of silver nanocubes before any HAuCl$_4$ has been added. FIG. 11A illustrates the good monodispersity that was achieved using the polyol process described above. These silver nanocubes had smooth surfaces and a mean edge length of 111 nm, with a standard deviation of 13 nm. The inset shows the electron diffraction pattern obtained by aligning the electron beam perpendicular to one of the square faces of a cube.

Figure 11B:
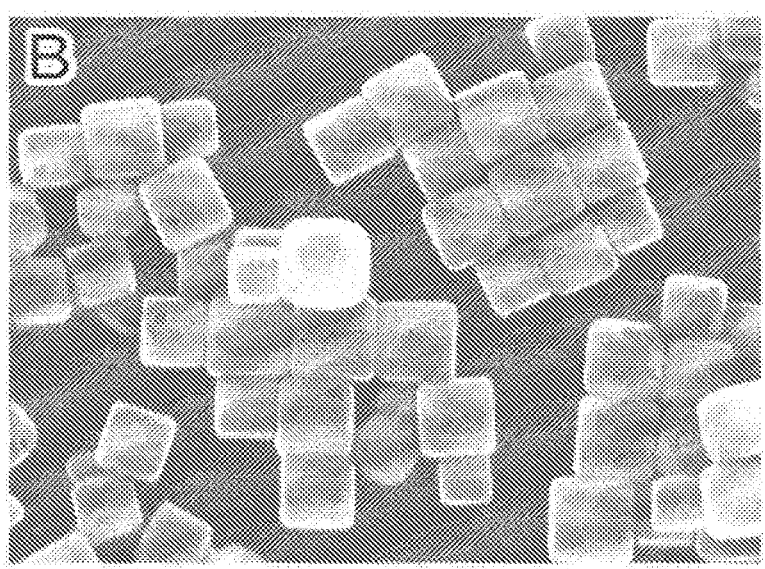
FIGS. 11B-11G and 11J-11M show SEM images of samples following the reaction silver nanocubes with differing amounts of $HAuCl_4$.
Figure 11C:
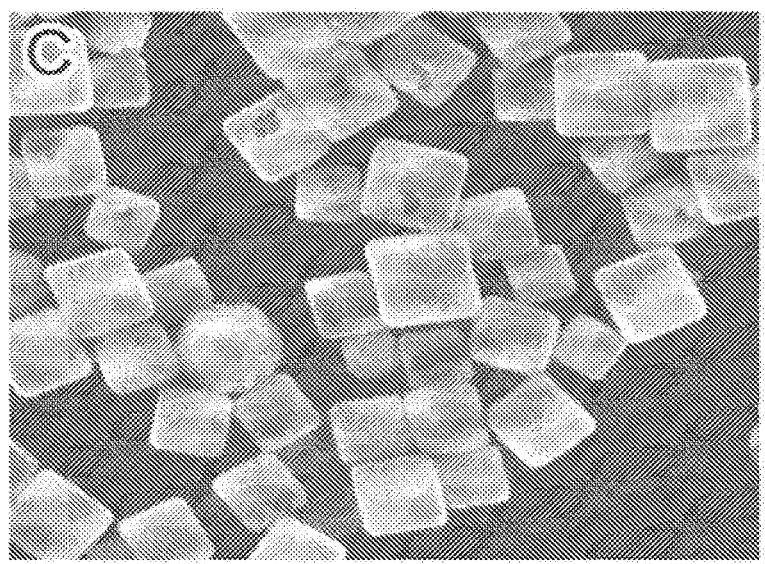

For the samples shown in FIGS. 11B-11K, HAuCl$_4$, each sample was allowed to react with an amount of 1×10$^{-3}$ mol/dm$^3$ HAuCl$_4$ solution for 20 minutes while vigorous stirring was maintained. FIG. 11B shows an SEM image of a sample of silver nanocubes after reaction with 0.05 mL of HAuCl$_4$ solution. As shown in FIG. 11B, small holes had formed in the nanocubes, as indicated by the black spots on the surfaces of the cubes. SEM results over hundreds of particles indicated that only about one sixth of the particles could display holes. This observation confirms that only one hole was formed on each particle since each cube has six equivalently square faces and any one had the same possibility to sit against the substrate. The newly formed surfaces associated with the holes represent the more active sites in further replacement reactions. The particles had no apparent change in size during this initial reaction, indicating that the gold layers deposited on the surfaces were very thin. The thin gold layers might not be able to well passivate the surfaces of the silver cubes and thus the further reaction enlarged the holes, as shown in FIG. 11C.

Figure 11D:
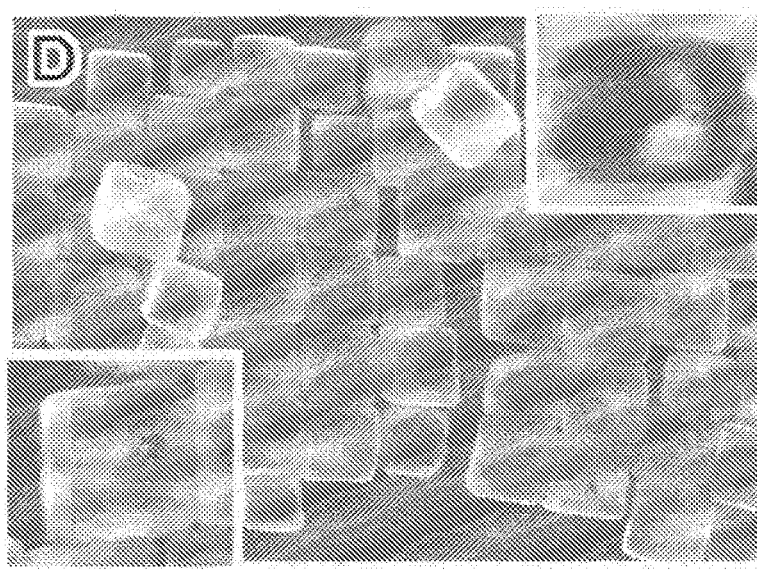

FIGS. 11C and 11D show SEM images of silver nanocubes following reaction with 0.10 mL (FIG. 11C) and 0.30 (FIG. 11D) of 1×10$^{-3}$ mol/dm$^3$ HAuCl$_4$ solution. The gold layers (or films) would be thickened when more gold atoms were generated by the replacement reaction. Once the gold layer thickness reached a critical value (about 1 nm), the holes would shrink due to the volume diffusion, surface diffusion, and/or dissolution and deposition promoted at 100° C. As shown in FIG. 11D, the openings were reduced as compared to those shown in FIG. 11C. The inset shown in the lower left corner of FIG. 11D gives the image of an individual cube with a slightly higher magnification, exhibiting the coarseness of the hole edge. The formation of extruded structures into the hole implied that the mass diffusion process might be account to the shrinkage of openings. In addition, the TEM image of a microtomed sample, shown in the inset in the upper right-hand corner of FIG. 11D, shows that the nanostructures formed at this stage were cubic particles with hollow interiors. When the volume of HAuCl$_4$ was high enough, the void sizes increased to form cubic nanoboxes with uniform walls, which were confirmed by the TEM image of a mirotomed nanobox (shown in the inset of FIG. 11E).

Figure 11E:
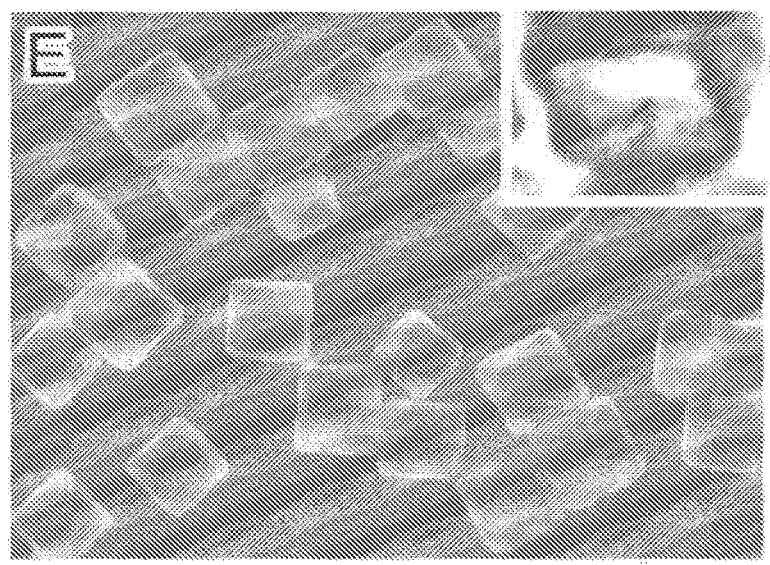

The SEM image in FIG. 11E and the TEM image in the inset of FIG. 11E show a sample after reacting with 0.50 mL of 1×10$^{-3}$ mol/dm$^3$ HAuCl$_4$ solution. Note that all the holes had disappeared and form seamless nanoboxes with smooth, nonporous surfaces. The inset in FIG. 11E shows a TEM image of a mircotomed nanobox. The hollow shape of the nanobox can be seen in this inset.

Figure 11F:
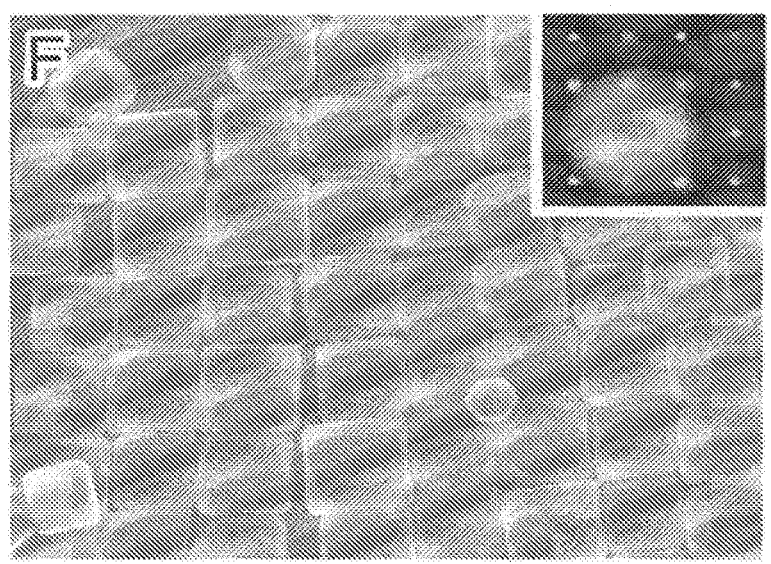

FIG. 11F shows an SEM image of a sample formed after reaction with 0.75 mL of $1\times10^{-3}$ mol/dm$^3$ HAuCl$_4$ solution. The nanoboxes in the sample had transformed into pinhole-free nanoboxes. The average edge length of these nanoboxes slightly increased to 117 from the original average edge length of the original silver nanocubes (111 nm). This increase indicates that the generated gold was deposited on the surfaces of the silver nanocubes. The inset in FIG. 11F shows an electron diffraction pattern which was recorded by directing the electron beam perpendicular to one of the square surfaces. The pattern show in this inset displayed the same symmetry as that of silver nanocubes, implying an epitaxial relationship existed between the walls of the nanoboxes and surfaces of the silver nanocubes during the replacement process. The corners of some nanoboxes shown in FIG. 11F were slightly truncated, indicating the start of dealloying process.

Figure 11G:
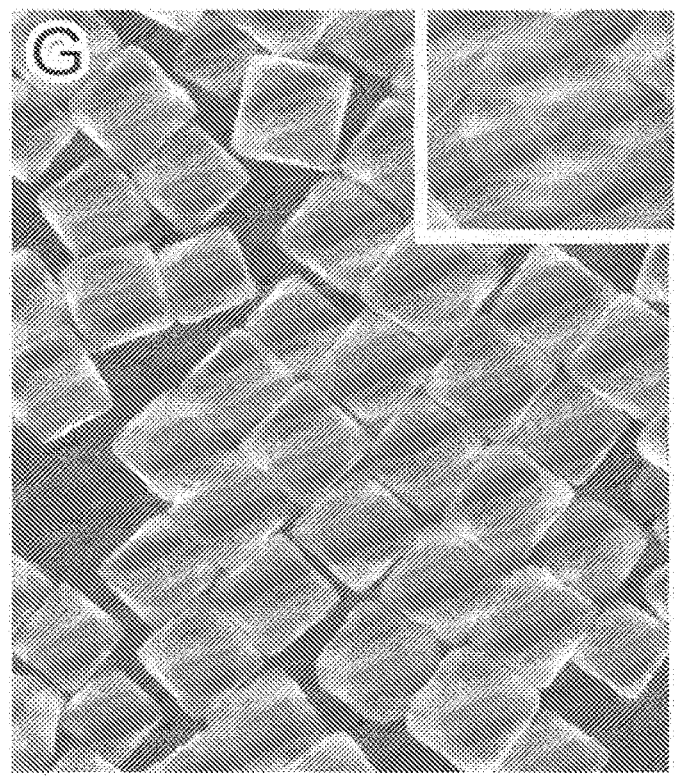

FIG. 11G shows an SEM image of a sample of silver nanocubes after reaction with 1.00 mL of $1\times10^{-3}$ mol/dm$^3$HAuCl$_4$ solution. The nanoboxes formed were truncated and each one was bounded by two sets of facets (eight triangular faces and six octagonal ones). The inset shows the SEM image of a truncated nanobox sitting on the silicon substrate against one of its triangular faces. The crystalline structure of these truncated nanoboxes was examined using electron diffraction.

Figure 11H:
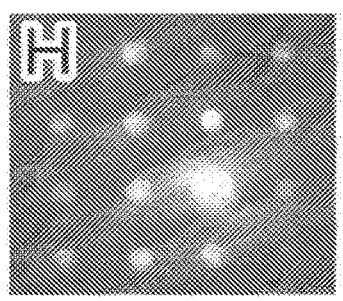
FIGS. 11H and 11I show electron diffraction patterns of two nanoboxes.
Figure 11I:
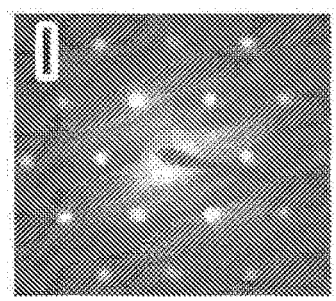
Figure 11J:
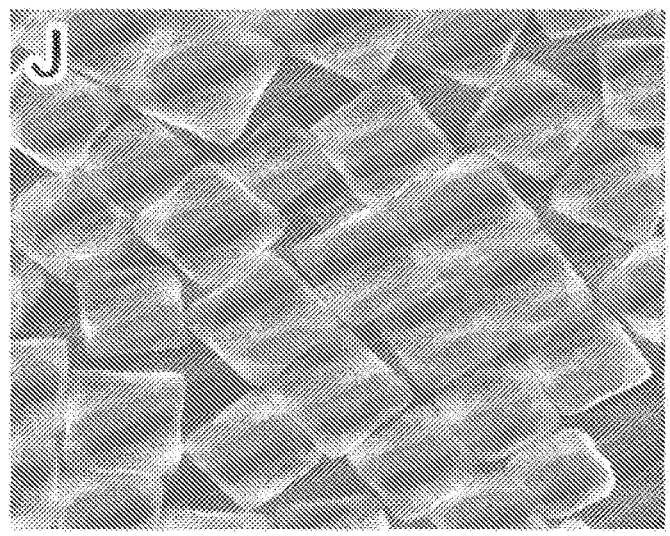
Figure 11K:
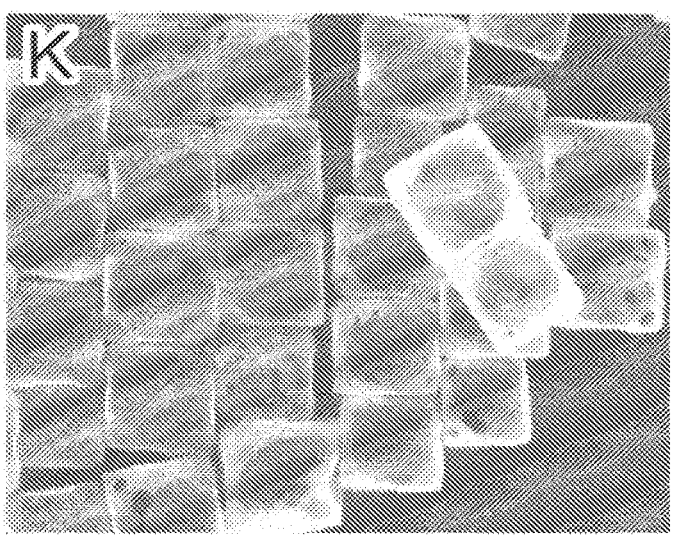

FIGS. 11H and 11I give the electron diffraction patterns recorded from two nanoboxes sitting on the TEM grids against one of their octagonal and triangular faces, respectively. These patterns indicated that each truncated nanobox was a single crystal, with its octagonal faces being bounded by {100} crystallographic planes and triangular ones by {111} planes. As shown in FIG. 11J, the walls of truncated nanoboxes were decorated with small pinholes of 1-5 nm in size as the volume of $1\times10^{-3}$ mol/dm$^3$ HAuCl$_4$ solution was increased to 1.50 mL. These pinholes were enlarged during the further dealloying process, as shown in FIG. 11K. The truncated corners bounded by {111} facets disappeared and also transformed into large pores. Most pores exhibited the square profile. These porous nanoboxes are referred to as nanocages. Electron diffraction results suggested that these cubic nanocages were also single crystals bounded by {100} planes.

Figure 11L:
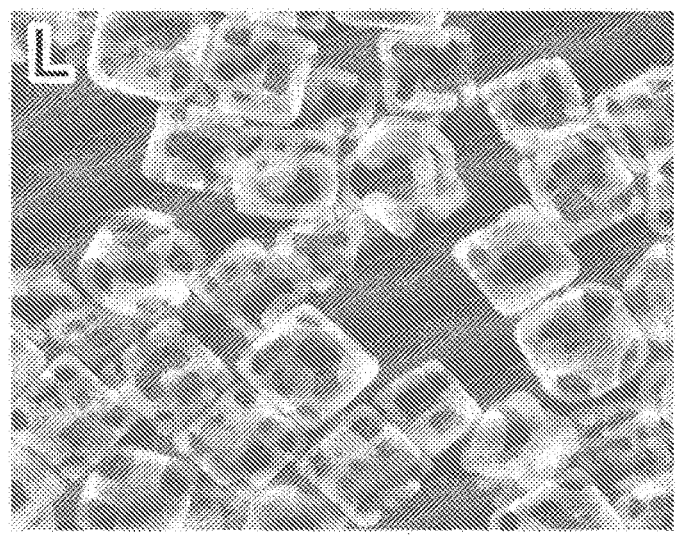
Figure 11M:
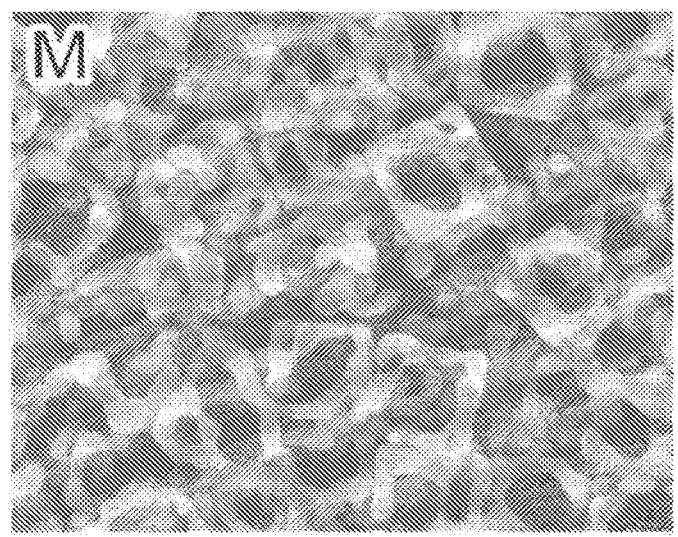

The nanoboxes of FIG. 11K were formed by reacting a sample of nanocubes as described above with 2.00 mL of $1\times10^{-3}$ mol/dm$^3$ HAuCl$_4$ solution. Once the dimension of these pinholes reached a critical value, they would coalesce into large pores with sizes ranging from 20 to 60 nm, as shown in FIG. 11L. The nanoboxes shown in FIG. 11L were formed by reacting a sample of nanocubes as described above with 2.25 mL of $1\times10^{-3}$ mol/dm$^3$ HAuCl$_4$ solution. The nanocages collapsed into gold fragments when the silver nanocubes had reacted with 2.5 mL of $1\times10^{-3}$ mol/dm$^3$ HAuCl$_4$ solution, shown in FIG. 11M.

Gold/silver alloyed nanoshells such as those formed by the methods described herein were found to be about seven times more sensitive to environmental change when compared with solid gold colloids having roughly the same diameters. Based on the Mie scattering theory, the SPR band of a metal nanoparticle is expected to red-shift with increasing the refractive index of the dispersion medium. The high sensitivity of gold/silver alloyed nanoshells to environmental change, as well as the high extinction coefficient in the red and NIR regions, should make nanoshells an ideal platform to probe biologically binding events which occur on the colloid surface.

Example 9

Figure 12A:
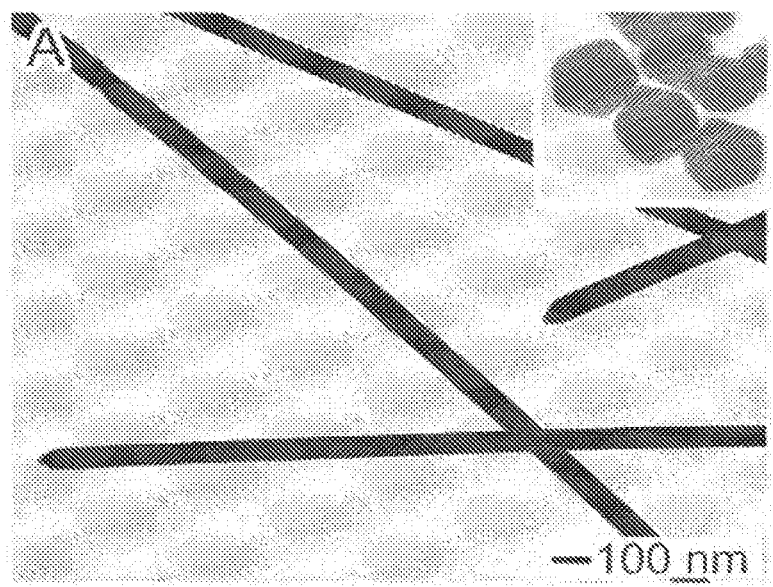
FIGS. 12A-12F show TEM images of samples before (FIG. 12A) and following the reaction silver nanowires with differing amounts of $HAuCl_4$ solution (FIGS. 12B-12F). The insets are SEM images.
Figure 12B:
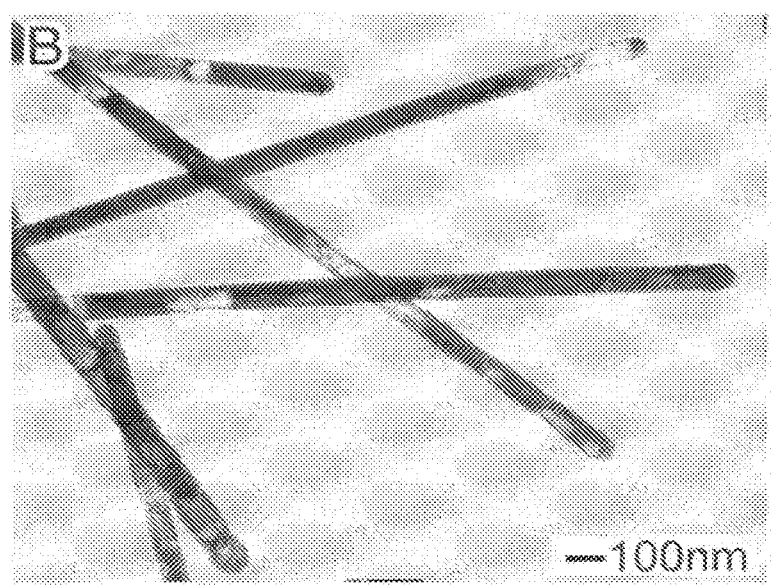
Figure 12C:
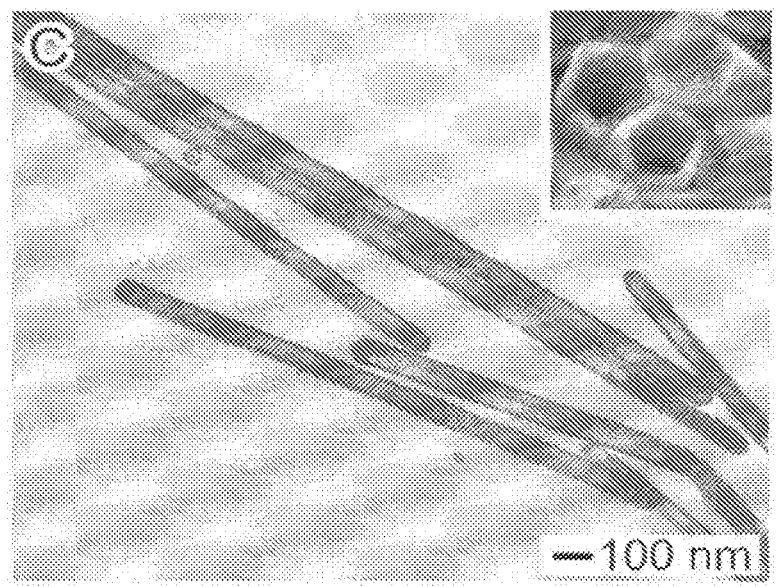
Figure 12D:
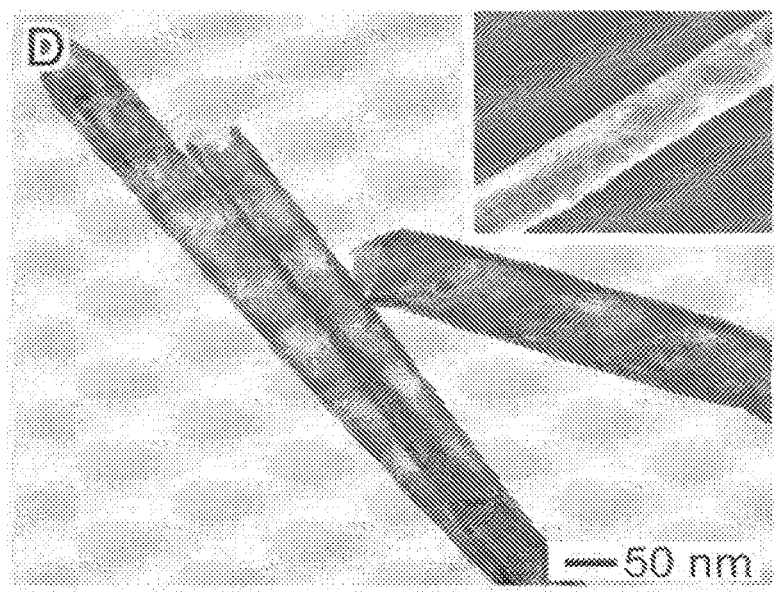
Figure 12E:
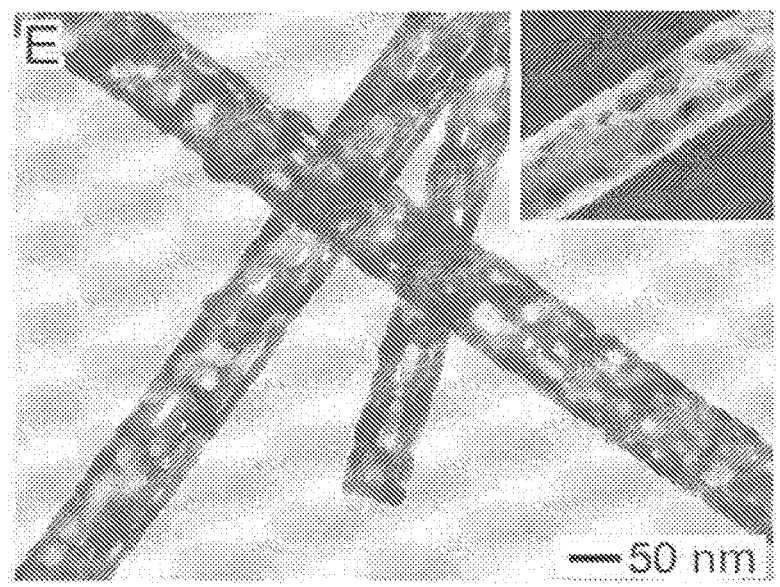
Figure 12F:
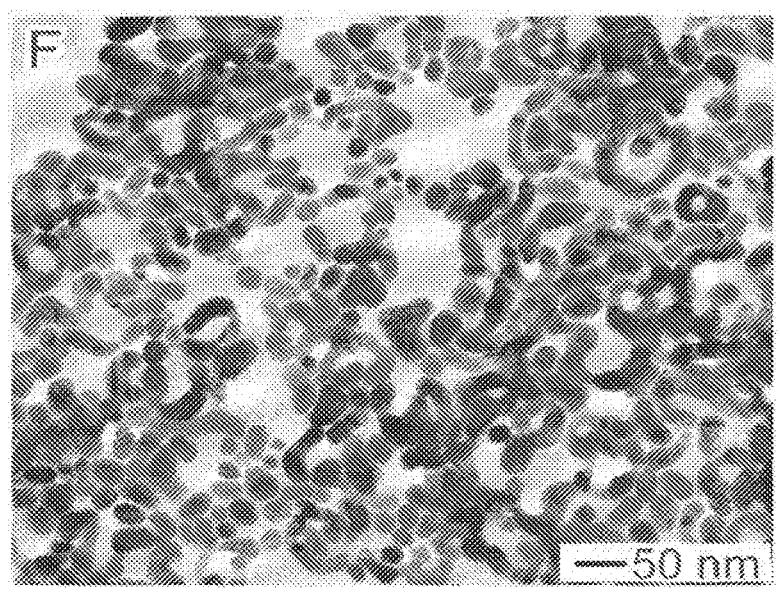

Silver nanowires synthesized via the polyol process represented another class of nanostructures with well-defined shapes. Each nanowire had a pentagonal cross section (as shown in the inset of FIG. 12A), five straight side edges parallel to its longitudinal axis, five flat side surfaces bounded by {100} facets, ten {111} end facets, and a five-fold twinned crystalline structure. Six 5 mL samples of a silver nanowire dispersion in water at a concentration of $1.2\times10^{-3}$ mol/dm$^3$ (in terms of silver atoms) were prepared and allowed to react with different volumes of $1\times10^{-3}$ mol/dm$^3$ HAuCl$_4$ solution. The TEM and SEM (insets) images of the resultant nanostructures are shown in FIGS. 12A-12F. FIG. 12A shows TEM images of silver nanowires before the addition of HAuCl$_4$ solution. FIG. 12B shows an image of a sample after reaction with 0.3 mL of $1\times10^{-3}$ mol/dm$^3$ HAuCl$_4$ solution; FIG. 12C shows a sample after reaction with 0.6 mL of $1\times10^{-3}$ mol/dm$^3$ HAuCl$_4$ solution, FIG. 12D shows sample after reaction with 1.5 mL of $1\times10^{-3}$ mol/dm$^3$ HAuCl$_4$ solution; FIG. 12E shows a sample after reaction with 2.3 mL of $1\times10^{-3}$ mol/dm$^3$ HAuCl$_4$ solution; and FIG. 12F shows a sample after reaction with 3.0 mL of $1\times10^{-3}$ mol/dm$^3$ HAuCl$_4$ solution. When the volume of HAuCl$_4$ was 0.3 mL, each silver nanowire developed interior cavities (i.e. tubular strips), as shown in FIG. 12B. All the silver nanowires were transformed into nanotubes with smooth and uniform sheaths (FIG. 12C) when the volume of HAuCl$_4$ solution added was 0.6 mL. These nanotubes inherited the typical morphological features of silver nanowires. As shown in the inset, each tube has a pentagonal cross section, five straight side edges and five flat side surfaces. The electron diffraction patterns taken from individual nanotubes were essentially the same as that of silver nanowires. These observations further confirmed that the elemental gold generated from the replacement reaction was epitaxially deposited on the surfaces of silver nanostructures. Dealloying of these Au/Ag nanotubes could also generate pinholes on their surfaces (FIGS. 12D and 12E). The pore size was dependent on the volume of HAuCl$_4$ that was added to the dispersion of silver nanowires. Similar to silver nanocubes, the holes with relatively large sizes (>20 nm) also displayed the square symmetry due to their side surfaces being bounded by {100} facets. FIG. 12 shows the result of complete dealloying, with the porous nanotubes collapsed into gold nanoparticles.

Example 10

Figure 13A:
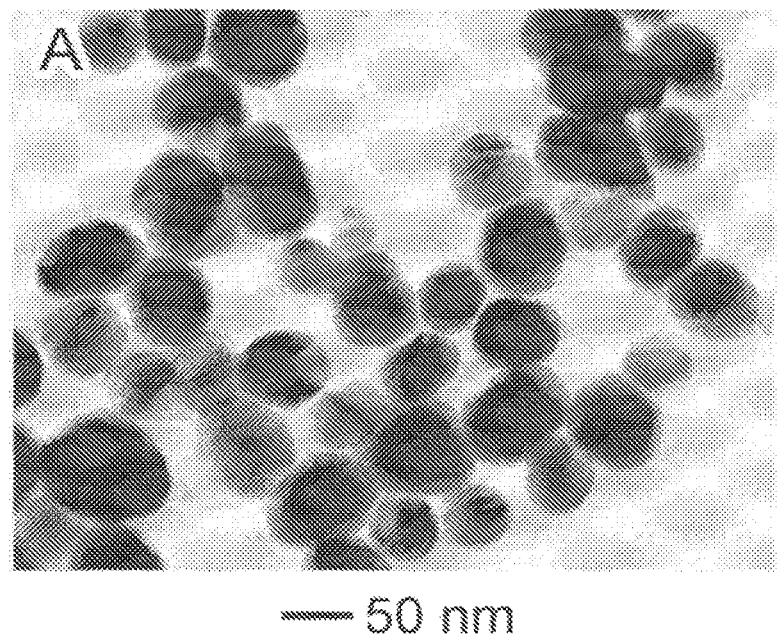
FIGS. 13A-13F show TEM images obtained from spherical silver nanoparticles before (FIG. 13A) and following reaction with differing amounts of $HAuCl_4$ solution (FIGS. 13B-13F). The insets are SEM images.
Figure 13B:
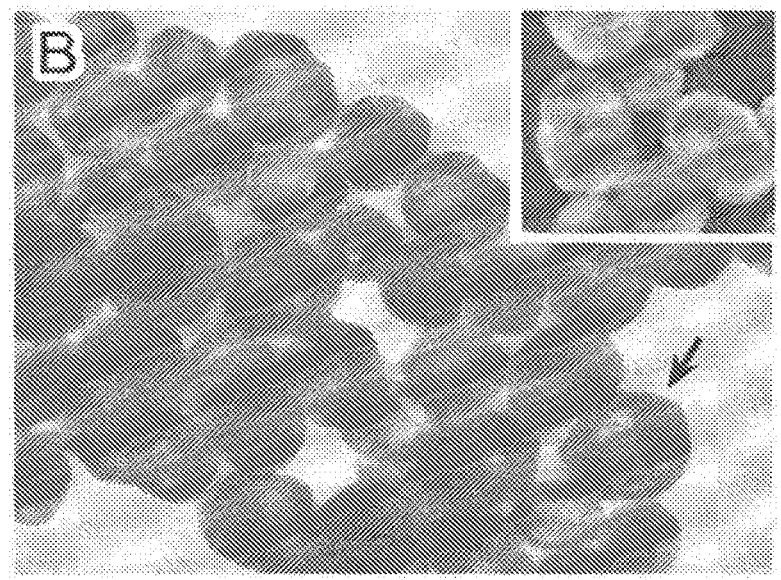
Figure 13C:
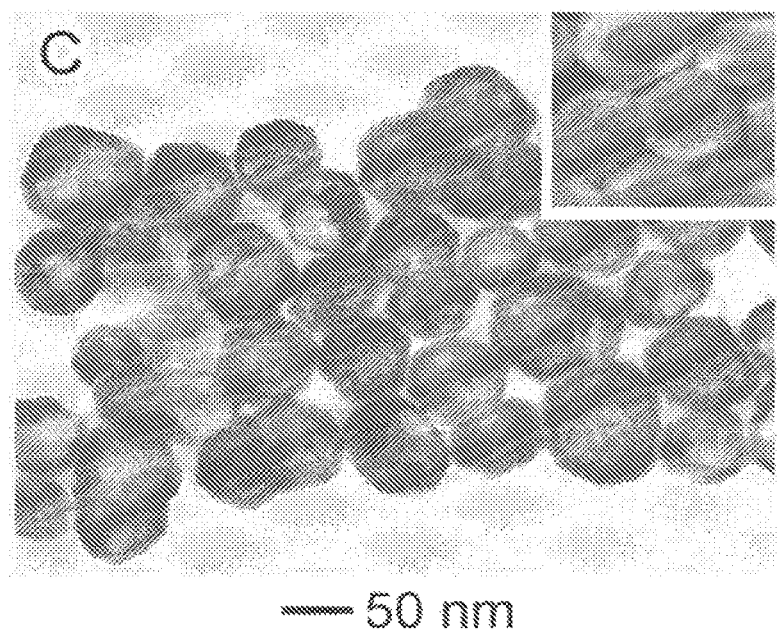
Figure 13D:
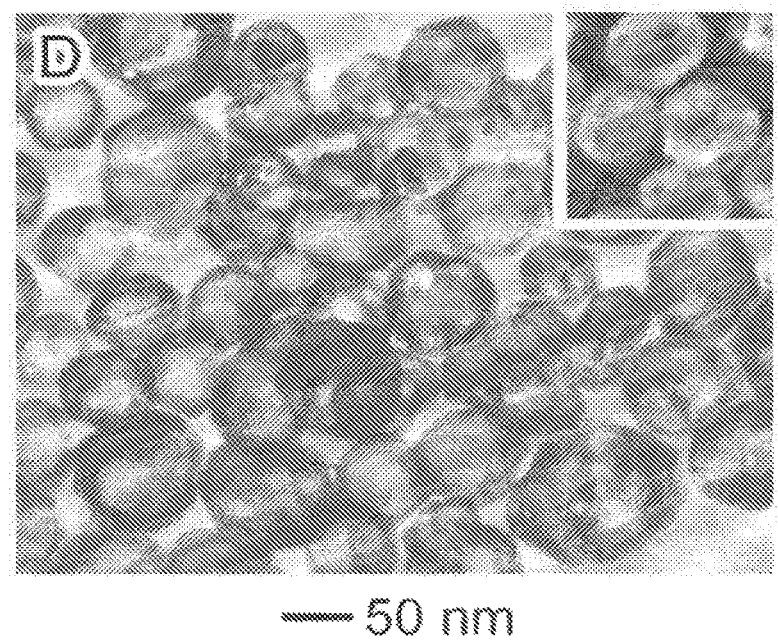
Figure 13E:
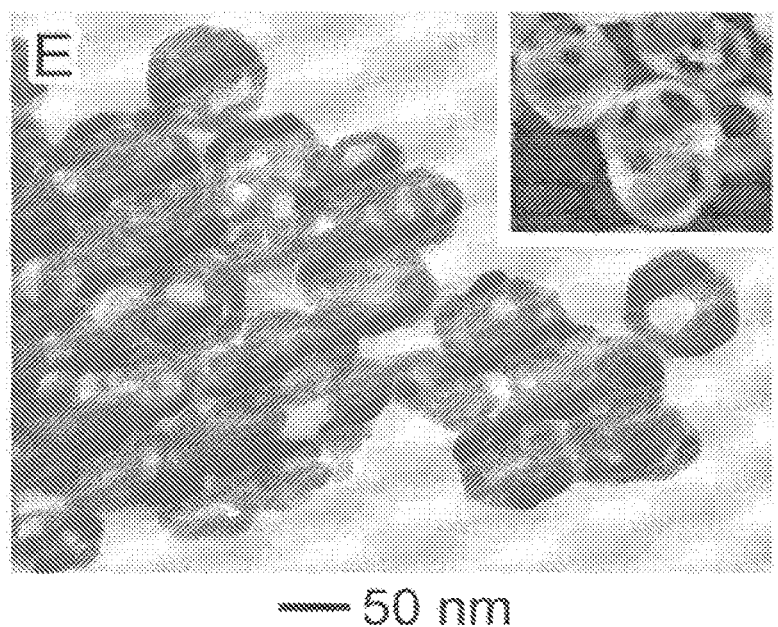
Figure 13F:
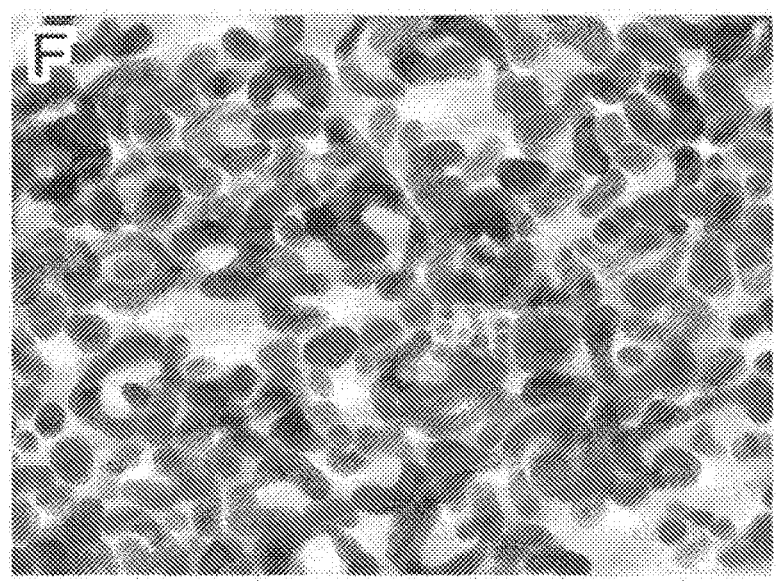

Six samples of silver microspheres were prepared and reacted with different amount of $1\times10^{-3}$ mol/dm$^3$ HAuCl$_4$ solution. Each sample was 5 mL and contained $1.5\times10^{11}$ silver microspheres in water. The TEM and SEM (the insets) images in FIGS. 13A-F shown the typical morphologies of the products formed at different stages in the replacement reaction. FIG. 13A shows solid silver nanoparticles, before the addition of HAuCl$_4$ solution. FIG. 13B shows hollow nanoparticles following reaction with 0.25 mL of $1\times10^{-3}$ mol/dm$^3$ HAuCl$_4$ solution. The nanoparticles shown in FIG. 13B have holes on their surfaces and small void sizes. FIG. 13C shows a sample of nanoparticles following reaction with 0.60 mL of $1\times10^{-3}$ mol/dm$^3$ HAuCl$_4$ solution. The nanoparticles shown in FIG. 13C are seamless nanoshells with uniform and homogeneous walls. FIG. 13D shows nanoparticles following reaction with 1.00 mL of $1\times10^{-3}$ mol/dm$^3$ HAuCl$_4$ solution. The nanoparticles shown in FIG. 13 are porous nanoshells with small pinholes. FIG. 13E shows nanoparticles following reaction with 1.20 mL of $1\times10^{-3}$ mol/dm$^3$ HAuCl$_4$ solution. As shown in FIG. 13E the resulting particles are nanocages with larger pores. FIG. 13F shows the result of adding 1.50 mL of $1\times10^{-3}$ mol/dm$^3$ HAuCl$_4$ solution. As shown in FIG. 13F the resulting particles are fragments of gold.

Example 11

Figure 14:
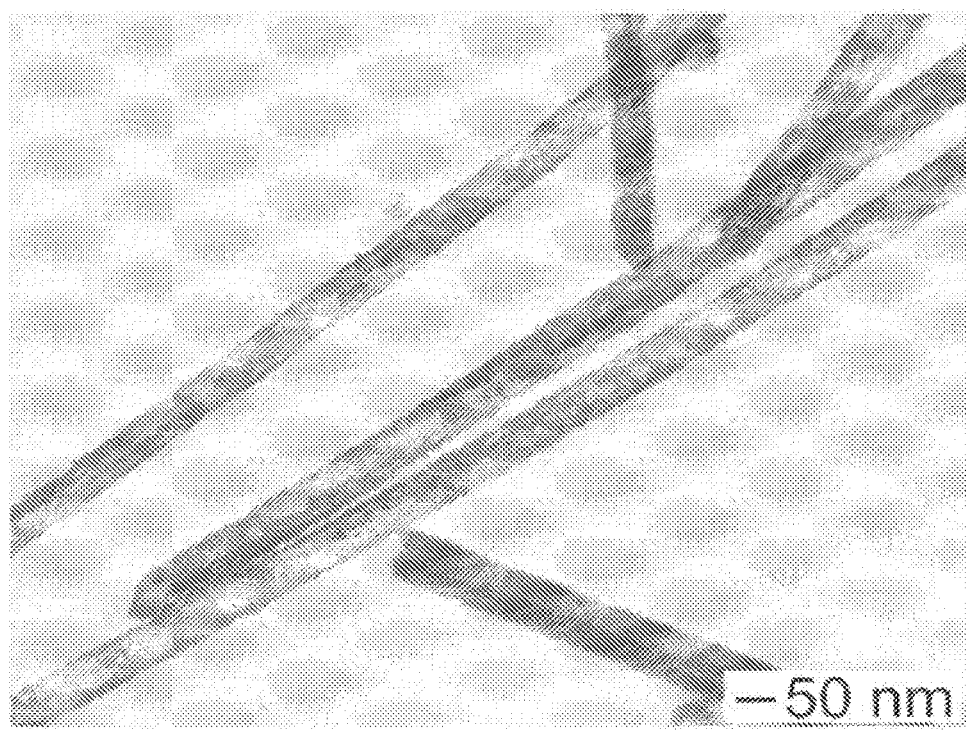
FIG. 14 shows a TEM image of Pt nanotubes formed by a method of the present invention.

Silver nanowires were used in a replacement reaction with platinum to form hollow nanostructures. A solution of 5 mL of silver nanowires at a concentration of $1.2\times10^{-3}$ mol/dm$^3$ (in terms of silver atoms) in water was prepared. The solution was refluxed with 1 mL of $2.55\times10^{-3}$ mol/dm$^3$ aqueous Pt(CH$_3$COO)$_2$ solution. By refluxing silver nanowires with the Pt(CH$_3$COO)$_2$ solution for 30 minutes, platinum/silver nanotubes were formed with relatively high yields. FIG. 14 shows a TEM image of the resulting Pt nanotubes. Compared with Au/Ag nanotubes, the walls of Pt/Ag nanotubes seemed to be rougher and primarily composed of discrete nanoparticles. This different could be attributed to the fact that the Ostwald ripening process for Pt/Ag nanoparticles might require a relatively higher temperature due to the higher melting point of this metal. As a result, the wall of Pt/Ag nanotubes could not effectively be reconstructed to form a highly crystalline structure at the refluxing temperature (about 100° C.) of an aqueous medium. This problem is expected to be solved by selecting a solvent with a higher boiling point, as long as it does not react with silver nanowires or the platinum salt and both silver nanowires and the platinum precursor can be well-dispersed or dissolved in it. For example, 2,4-pentanedione (CAS number 123-54-6) may be suitable solved for a platinum precursor solvent.

Example 12

Figure 15A:
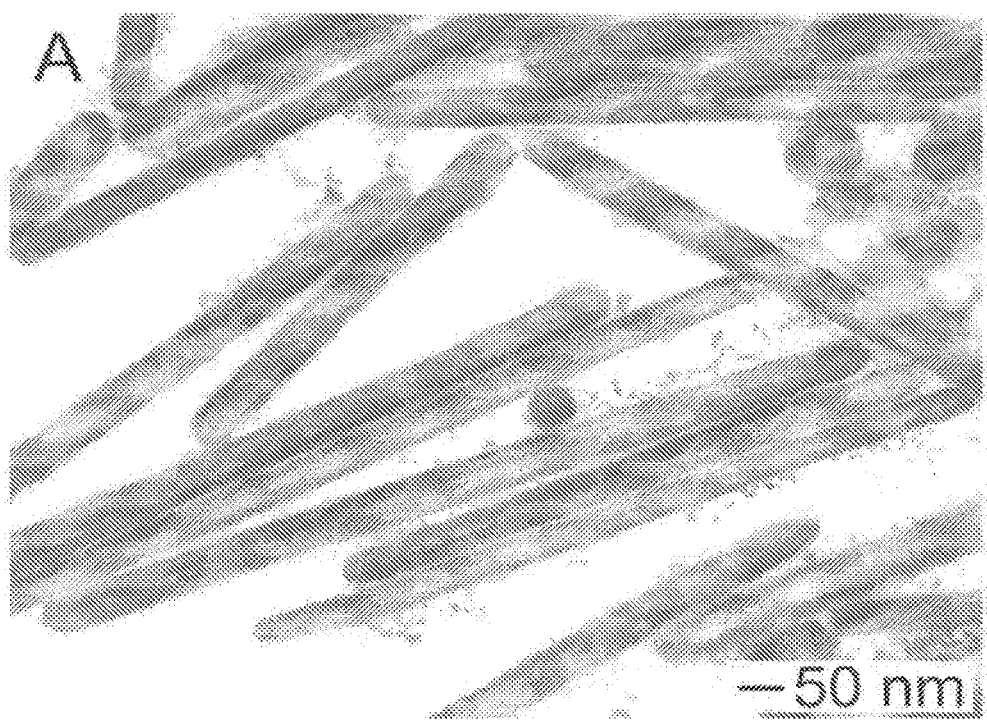
FIG. 15A shows another TEM image of Pd nanotubes.
Figure 15B:
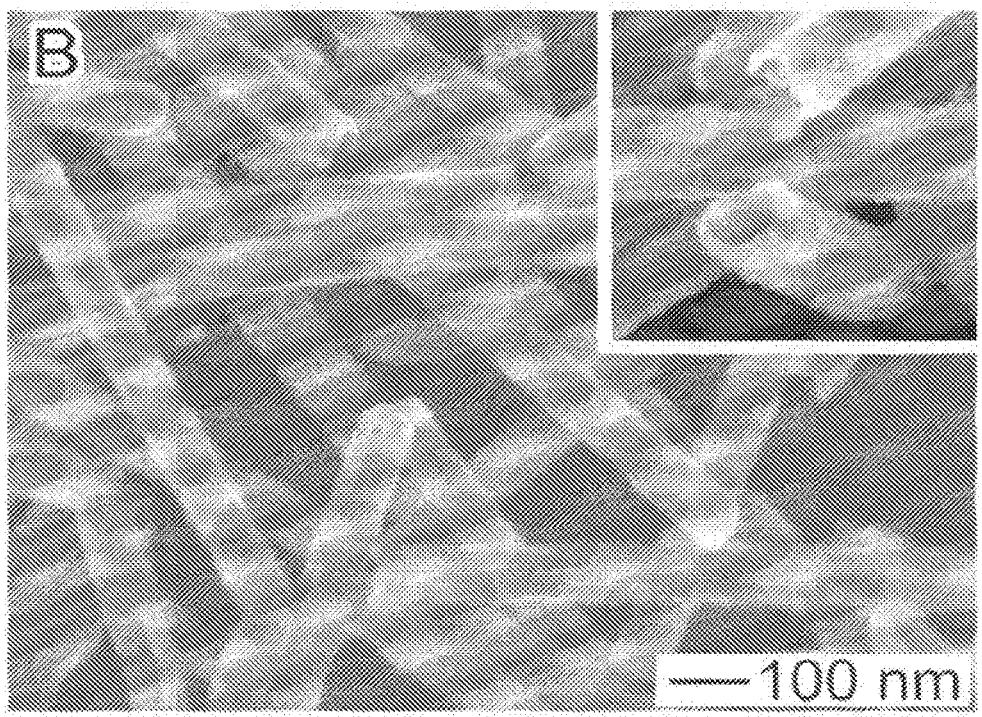
FIG. 15B shows a typical SEM image of sonicated nanotubes, indicating that their surfaces were still continuous and smooth.

A solution of 5 mL of silver nanowires at a concentration of $1.2\times10$-3 mol/dm$^3$ (in terms of silver atoms) was prepared and reacted with 1 mL of $10\times10^{-3}$ mol/dm$^3$ of an aqueous solution of Pd(NO)$_2$. The solution was refluxed for 30 minutes at a temperature of 100° C. Note that the Pd(NO$_3$)$_2$ solution should be freshly prepared before use to prevent the Pd/Ag cations from hydrolysis to form Pd(OH)$_2$ that will be unable to oxidize Ag to Ag$^+$. FIG. 15A shows a TEM image of Pd nanotubes obtained by this reaction. FIG. 15B shows a typical SEM image of sonicated nanotubes, indicating that their surfaces were still relatively continuous, smooth and nonporous. The inset of FIG. 15B shows that the Pd/Ag nanotubes were hollow and their walls were uniform in thickness. The Pd/Ag nanotubes could be used to catalyze the Suzuki coupling reaction, the coupling reaction between phenylboronic acid and iodobenzene. The Pd/Ag nanotubes performed well as a catalyst and could be easily recovered from the reaction mixture by centrifugation and reused as catalyst for another round of the Suzuku coupling reaction.

Example 13

Hollow silver or silver alloy nanoparticles were generated using sacrificial templates of Ni/Co alloy. A solution of Ni/Co alloyed particles was prepared by dissolving 0.2037 g Co(NO$_3$)2.6H$_2$O) and 0.3419 g NiSO$_4$.6H$_2$O in 1,2-propanediol. 0.2 g of NaOH was then added to the solution. After it was dissolved, 50 µL of $0.5\times10^{-3}$ mol/dm$^3$ AgNO$_3$ solution was added at room temperature. The mechanical stirring was kept throughout the synthesis. The final product was centrifuged and rinsed with ethanol, water and acetone. The solid products were redispersed in 20 mL of water. Hollow silver nanoparticles were obtained at a yield of about 80%. The volumes and concentrations described above for the replacement reactions for silver to gold may be used in converting Ni/Co nanoparticles to silver or its alloy.

Examples 14-16

Formation of Complex Nanoshells and Nanotubes

Example 14

To form rattle-like core/shell nanostructures, a solution of Au/Ag alloyed solid nanoparticles was prepared. Solid Au/Ag alloyed nanoparticles with a gold molar fraction in the range of 0.1-1.0 were prepared by the following process: An appropriate volume (for example, 0.31 mL was added if the gold molar fraction was 0.75) of $3\times10^{-2}$ mol/dm$^3$ HAuCl$_4$ was added to 50 mL of water and the solution was then heated to its boiling temperature. To this hot solution was added a sufficient amount of 2×10-2 mol/dm$^3$ aqueous AgNO$_3$ to bring the total concentration of silver and gold species (HAuCl$_4$ and AgNO$_3$) to $0.25\times10^{-3}$ mol/dm$^3$. A volume of 1% sodium citrate solution (2.5 mL) was added to the refluxing solution and allowed to reflux for 30 minutes. The final solution was then left to cool to room temperature.

Silver plating solutions were mixed with the dispersion of Au/Ag alloyed solid nanoparticles, resulting in the formation of silver layers. Au/Ag alloyed solid nanoparticles with a gold fraction of 0.75 were used. 15 mL of the Au/Ag solution prepared as described above was mixed with 2.5 mL of 0.1 mol/dm$^3$ ascorbic acid (99.9+%, Aldrich). Then 2.5 mL of $5\times10^{-3}$ mol/dm$^3$ AgNO$_3$ solution was added to the mixture dropwise. The reaction was allowed to proceed for 30 minutes with vigorous stirring. The products were centrifuged at a rate of 2500 rpm for 15 minutes. The supernatant was removed using a pipet. The settlings were redispersed in 15 mL water.

The redispersed settlings were refluxed for 15 minutes and a 40.4 mL aliquot of $1\times10^{-3}$ mol/dm$^3$ HAuCl4 was added to the hot solution dropwise. The mixture was refluxed for 20 minutes. The yield of core/shell structures obtained by this method was as high as 95%.

Example 15

Multiple walled nanotubes were formed by first synthesizing Ag/Au single-walled nanotubes. The single-walled nanotubes were generated by diluting a 250 µL aliquot of silver nanowires (0.02 mol/dm$^3$ in terms of silver atoms) with 5 mL water. After refluxing for 15 minutes, 1 mL of aqueous $1\times10^{-3}$ mol/dm$^3$ HAuCl$_4$ solution (99.9%, Aldrich) was added dropwise, and the mixture continued to reflux for another 10 minutes. To coat the nanotubes with silver sheaths, 3 mL of the resulting dispersion of silver nanotubes was mixed with 0.8 mL of ascorbic acid ($0.1\times10^{-3}$ mol/dm$^3$ 99+%, Aldrich), and 0.8 mL of AgNO$_3$ solution ($5\times10^{-3}$ mol/dm$^3$, 99+%, Aldrich) was added dropwise. This electroless plating process was allowed to proceed for 30 minutes at room temperature and the mixture was centrifuged at 2000 rpm for 15 minutes to remove the excess ascorbic acid.

For the synthesis of Ag/Au double-walled nanotubes, the Ag-coated nanotubes were redispersed in 5 mL water and used for another round of replacement reaction. In this round, a 0.8-mL aliquot was used to generate double-walled nanotubes of Au/Ag alloy. By adding another round of the electroless plating of silver (using 1.2 mL of $5\times10^{-3}$ mol/dm$^3$ AgNO$_3$) and replacement reaction (using 1.2 mL of $1\times10^{-3}$ mol/dm$^3$ HAuCl$_4$ solution, triple walled nanotubes of Au/Ag alloy were also synthesized.

Figure 16A:
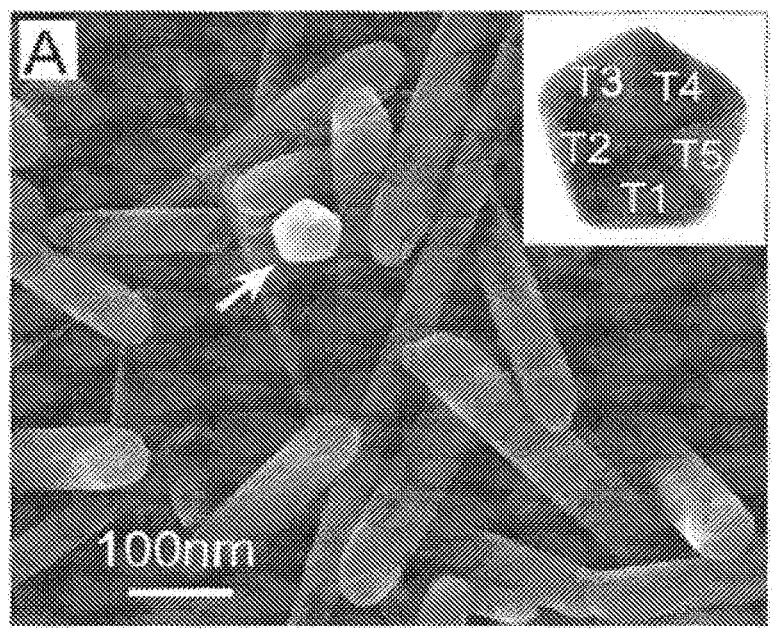
FIG. 16A shows SEM images and FIG. 16B shows SAED patterns of silver nanowires.
Figure 16B:
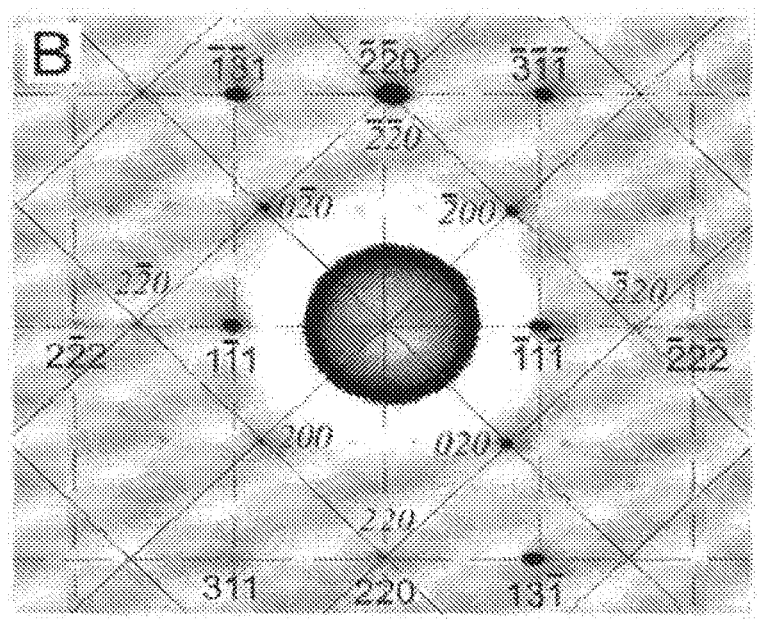
Figure 16C:
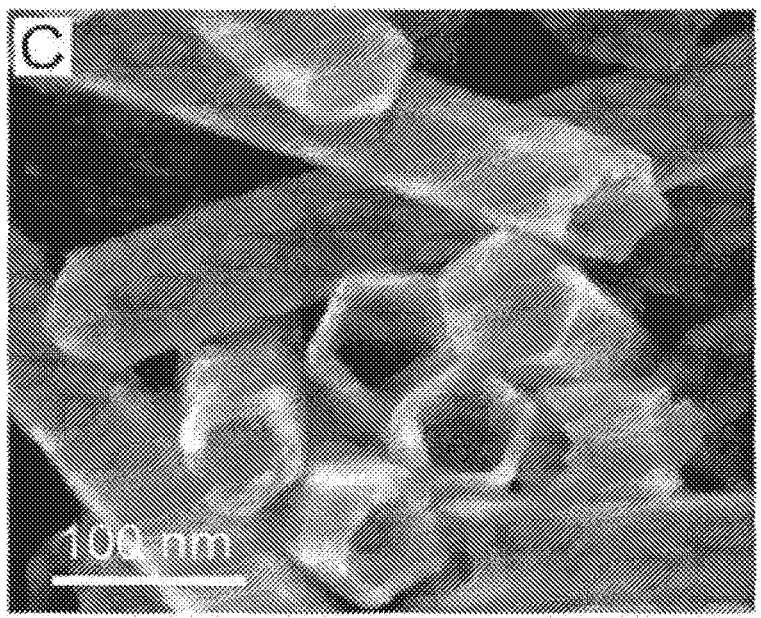
FIG. 16C shows SEM images and FIG. 16D shows SAED patterns of single-shelled nanotubes of Au/Ag alloy.
Figure 16D:
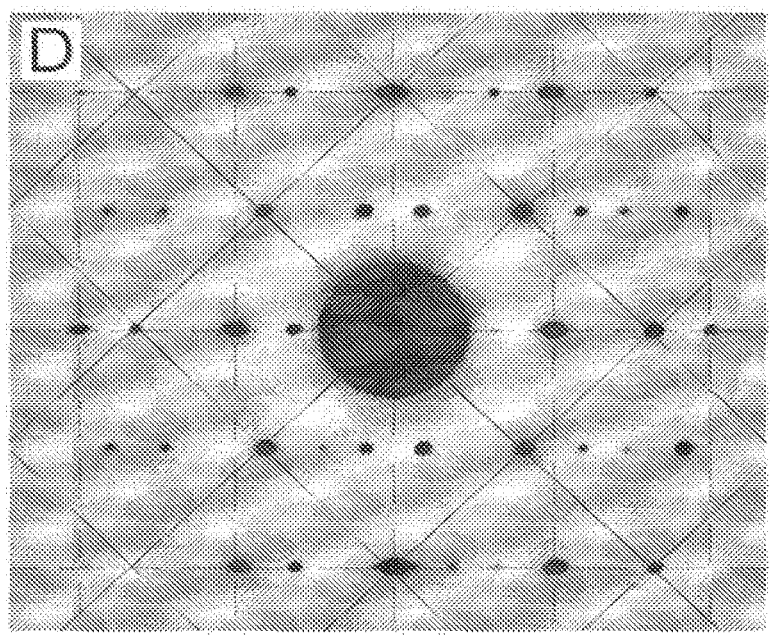
Figure 16E:
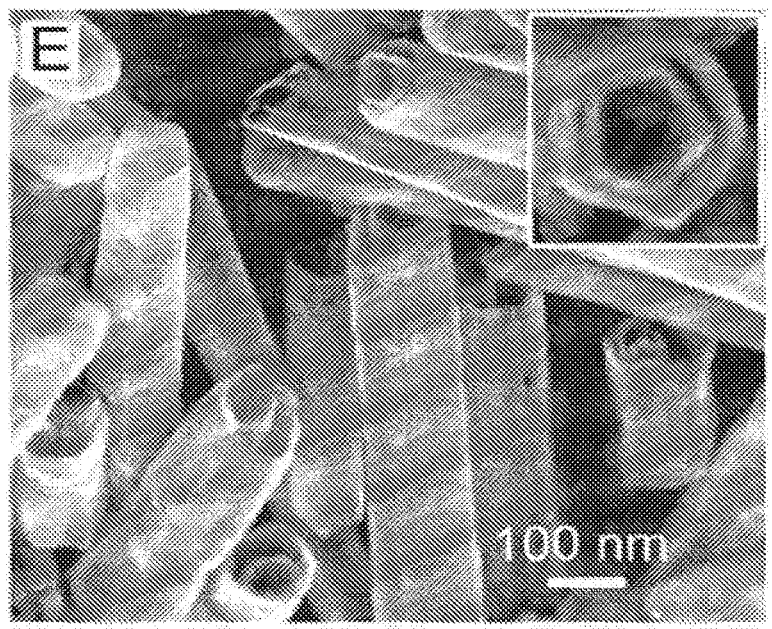
FIG. 16E shows SEM images and FIG. 16F shows SAED patterns of double-shelled nanotubes of Au/Ag alloy.
Figure 16F:
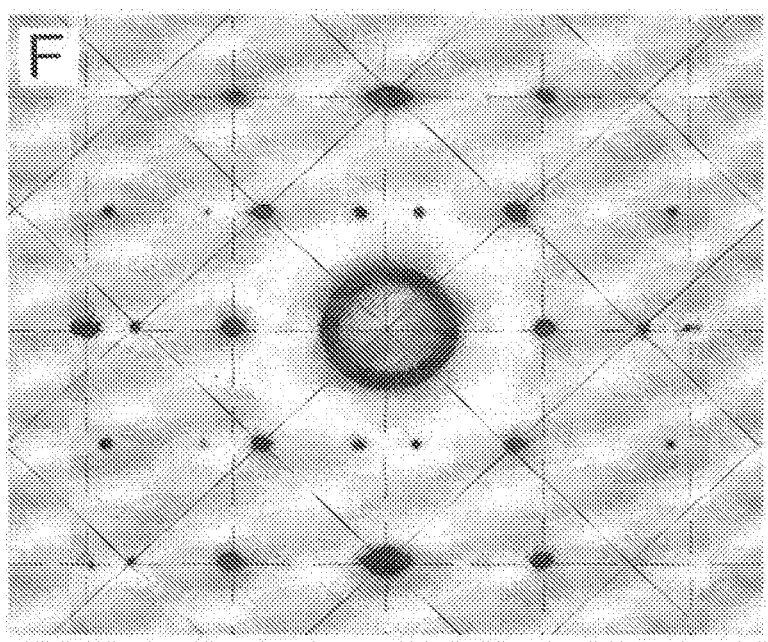
Figure 17:
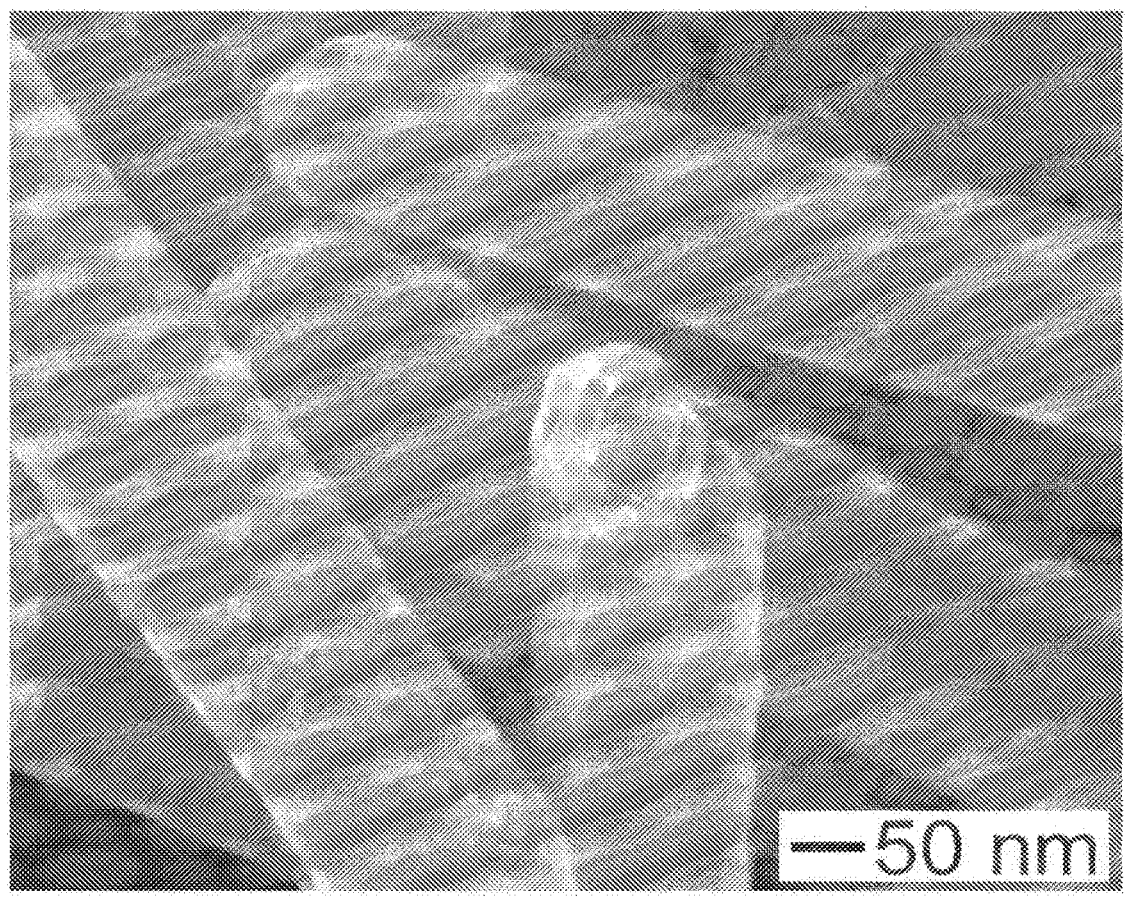
FIG. 17 shows an SEM image of triple-shelled nanotubes of Au/Ag alloy.

FIG. 16A shows SEM images and FIG. 16B shows selected area electron diffraction ("SAED") patterns of silver nanowires. FIG. 16C shows SEM images and FIG. 16D shows SAED patterns of single-walled nanotubes of Au/Ag alloy. FIG. 16E shows SEM images and FIG. 16F show SAED patterns of double-walled nanotubes of Au/Ag alloy. All samples were sonicated for 1 hour to expose the cross section of these on-dimensional nanostructures. The Ag nanowires had a mean diameter of about 50 nm and the single walled nanotubes had a similar diameter, with a wall thickness around 7 nm. The inset in 16A is a TEM image of the cross-section of an individual Ag nanowire, indicating that each wire had a 5-fold twinned structure characterized by five single crystalline subunits (marked T1, T2, T3, T4, and T5). The SAED patterns shown in 16B, 16D and 16F are essentially the same, suggesting that an epitaxial process was involved in the morphological evolution from nanowires to nanotubes. FIG. 17 shows an SEM image of triple walled nanotubes of Au/Ag alloy.

Example 16

For the synthesis of double-walled nanotubes whose outer walls were made of Pd/Ag alloy and the inner walls made of Au/Ag alloy, an aqueous solution of Pd(NO$_3$)$_2$ ($1\times10^{-2}$ mol/dm$^3$, 99.9%, Alfa Aesar in Ward Hill, Mass.) was used for the second step of replacement reaction. Vigorous magnetic stirring was maintained throughout the syntheses. Before analysis the AgCl contaminant in nanotube samples was removed by dissolving with a saturated NaCl solution. The nanotubes were recovered by centrifuging the suspension at 8000 rpm for 12 minutes, followed by rinsing 5 times with water. SEM images of the nanotubes were obtained using a FEI field emission microscope (Sirion XL) operated at 20 kV. In preparing the SEM samples, the nanotubes and nanowires were sonicated for 1 hour to expose their cross section, and then small droplets of their aqueous dispersion were put on silicon substrates.

Figure 18:
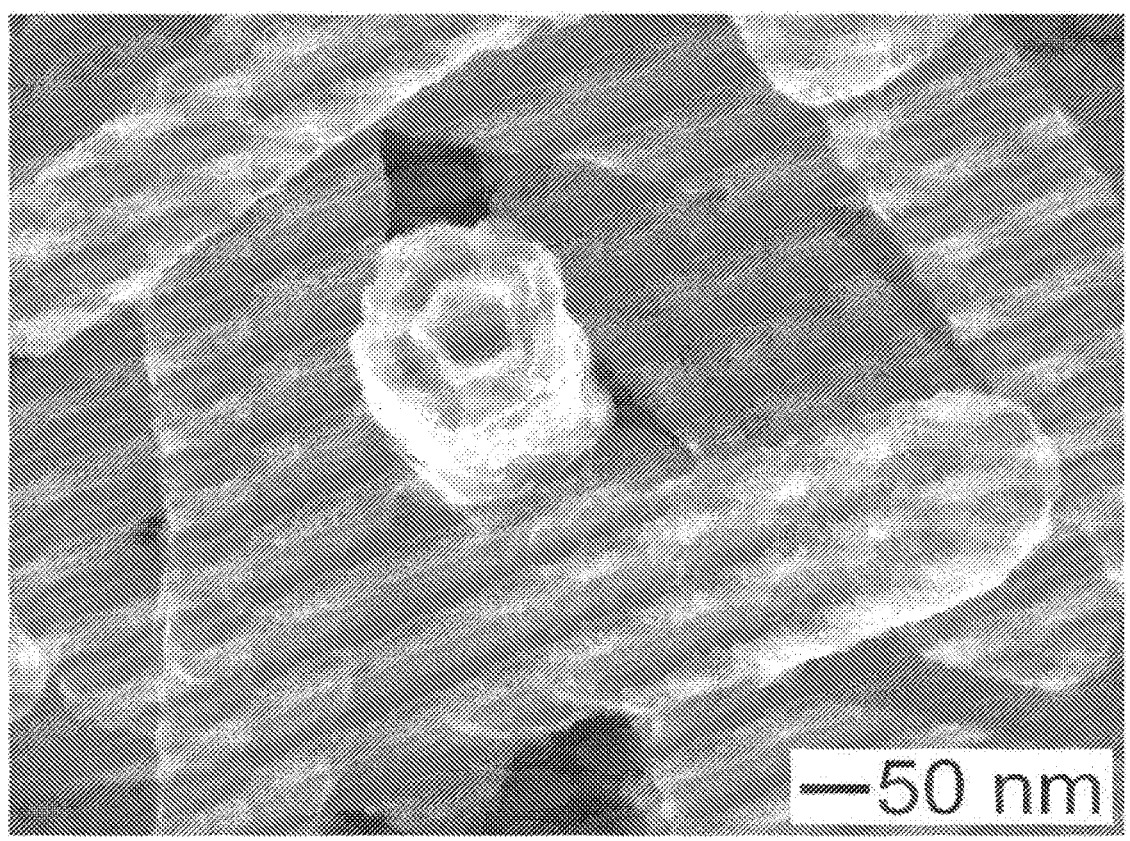
FIG. 18 shows an SEM image of double shelled nanotubes with the constituent material of inner shell being Au/Ag alloy and the outer shell being Pd/Ag alloy.

FIG. 18 shows SEM images of double walled with the constituent material of inner wall being Au/Ag alloy and the outer wall being Pd/Ag alloy.

It will be obvious to those having skill in the art that many changes may be made to the details of the above-described embodiments without departing from the underlying principles of the invention. The scope of the present invention should, therefore, be determined only by the following claims.

The invention claimed is:

1. A method of manufacturing metal nanostructures comprising:
providing a mixture comprising a metal salt, a polyol, and a capping agent;
forming metal nanostructures having a desired shape under reaction conditions configured to yield the desired shape at a higher percentage than any other nanostructure shape; and
separating the nanostructures having the desired shape from nanostructures of other shapes, wherein the separating comprises filtering nanostructures having the desired shape from nanostructures of other shapes.

2. The method of claim 1, wherein the reaction conditions comprise a concentration of the metal salt in the polyol and a molar ratio of the capping agent to the metal salt.

3. The method of claim 1, wherein the metal salt is a silver salt.

4. The method of claim 1, wherein the metal salt is silver nitrate.

5. The method of claim 1, wherein the capping agent is poly(vinyl pyrrolidone) (PVP).

6. The method of claim 1, wherein the polyol is ethylene glycol.

7. The method of claim 1, wherein the desired nanostructure shape is selected from the group consisting of nanocubes, half-cubes, pyramids, nanowires, and multiply-twinned particles.

* * * * *